United States Patent
Noll et al.

(10) Patent No.: US 9,476,624 B2
(45) Date of Patent: Oct. 25, 2016

(54) SCROLL COMPRESSOR DIFFERENTIAL PRESSURE CONTROL DURING COMPRESSOR SHUTDOWN TRANSITIONS

(71) Applicant: Liebert Corporation, Columbus, OH (US)

(72) Inventors: Roger Noll, Gahanna, OH (US); Lou Monnier, Westerville, OH (US); Gary A. Helmink, Galloway, OH (US); Zhiyong Lin, Dublin, OH (US); Daniel J. Schutte, Lewis Center, OH (US); Benedict J. Dolcich, Westerville, OH (US)

(73) Assignee: Liebert Corporation, Columbus, OH (US)

(*) Notice: Subject to any disclaimer, the term of this patent is extended or adjusted under 35 U.S.C. 154(b) by 213 days.

(21) Appl. No.: 14/169,185

(22) Filed: Jan. 31, 2014

(65) Prior Publication Data

US 2014/0230467 A1 Aug. 21, 2014

Related U.S. Application Data

(60) Provisional application No. 61/765,884, filed on Feb. 18, 2013.

(51) Int. Cl.
F25D 17/06 (2006.01)
F25B 49/02 (2006.01)
(Continued)

(52) U.S. Cl.
CPC ............. F25B 49/022 (2013.01); F04C 18/02 (2013.01);
(Continued)

(58) Field of Classification Search
CPC ...... F04C 23/001; F04C 28/06; F04C 18/02; F04C 28/28; F04C 18/0207; F04C 2270/701; F04C 2270/06; F04C 28/08; F04C 2270/50; F04C 2270/21; F04C 2270/80; Y02B 30/741; Y02B 30/743; F25B 2700/1931; F25B 2600/111; F25B 2600/0253; F25B 2400/00; F25B 49/022; F25B 49/027; F25B 1/04; F25B 2400/075; F25B 2700/1933; F25B 2700/2106

See application file for complete search history.

(56) References Cited

U.S. PATENT DOCUMENTS 3,877,839 A * 4/1975 Ifield ..................... F04B 1/2071
417/217
(Continued)

FOREIGN PATENT DOCUMENTS

CN 1272171 A 11/2000
CN 1834463 A 9/2006
(Continued)

OTHER PUBLICATIONS

Kim, Young Min, Shin, D.K.K.; and Lee, J.H.H., "A New Ericcson Cycle Compromising a Scroll Expander and a Scroll Compressor for Power Refridgeration Applications" (2004) Int'l Refridgeration and Air Conditioning Conference. Paper 719. Purdue University (Purdue e-Pubs).

(Continued)

Primary Examiner — Len Tran
Assistant Examiner — Anna Vazquez
(74) Attorney, Agent, or Firm — Harness, Dickey & Pierce, P.L.C.

(57) ABSTRACT

A method including determining whether an OFF criterion is satisfied for a lag compressor of a tandem set of scroll compressors. The tandem set of scroll compressors includes a lead compressor. The method further includes: initiating at least one process when the OFF criterion is satisfied; and maintaining the lag compressor in an ON state for a predetermined period subsequent to the OFF criterion being satisfied. The at least one process includes at least one of: operating the lead compressor at a maximum level; overriding a motor overload protection method, wherein the motor overload protection method protects motors of the lead compressor and the lag compressor; and overriding a proportional integral derivative (PID) method to reduce a speed of a condenser fan. The PID method controls the speed of the condenser fan. A system including the lag compressor module and the lead compressor module.

20 Claims, 24 Drawing Sheets

(51) Int. Cl.
  *F04C 23/00* (2006.01)
  *F04C 28/06* (2006.01)
  *F04C 28/28* (2006.01)
  *F04C 18/02* (2006.01)
  *F25B 1/04* (2006.01)
  *F04C 28/08* (2006.01)

(52) U.S. Cl.
  CPC ............. *F04C 23/001* (2013.01); *F04C 28/06* (2013.01); *F04C 28/28* (2013.01); *F04C 28/08* (2013.01); *F04C 2270/06* (2013.01); *F04C 2270/701* (2013.01); *F04C 2270/80* (2013.01); *F25B 1/04* (2013.01); *F25B 49/027* (2013.01); *F25B 2400/075* (2013.01); *F25B 2600/0253* (2013.01); *F25B 2600/111* (2013.01); *F25B 2700/1931* (2013.01); *F25B 2700/1933* (2013.01); *F25B 2700/2106* (2013.01); *Y02B 30/741* (2013.01); *Y02B 30/743* (2013.01)

(56) References Cited

U.S. PATENT DOCUMENTS

| | | | |
|---|---|---|---|
| 4,152,902 A * | 5/1979 | Lush | ................. F04C 28/02 236/1 E |
| 6,047,557 A * | 4/2000 | Pham | ................. A47F 3/04 236/1 EA |
| 6,170,277 B1 | 1/2001 | Porter | |
| 6,532,751 B1 * | 3/2003 | Schenk | ................. F25C 1/04 62/137 |
| 6,826,917 B1 | 12/2004 | Bodell, II et al. | |
| 8,276,395 B2 | 10/2012 | Lifson et al. | |
| 8,784,067 B2 | 7/2014 | Iwano et al. | |
| 8,813,511 B2 | 8/2014 | Kopko | |
| 2004/0024495 A1 | 2/2004 | Sunderland | |
| 2010/0057263 A1 | 3/2010 | Tutunoglu | |
| 2010/0178174 A1 * | 7/2010 | Mehaffey | ................. F04B 49/20 417/2 |

FOREIGN PATENT DOCUMENTS

| | | |
|---|---|---|
| CN | 101354036 A | 1/2009 |
| CN | 101627268 A | 1/2010 |
| CN | 101721077 A | 6/2010 |
| EP | 2679930 A1 | 1/2014 |
| WO | WO-99/17066 A1 | 4/1999 |
| WO | WO-2012/114454 A1 | 8/2012 |
| WO | WO-2012114454 A1 | 8/2012 |

OTHER PUBLICATIONS

Search Report for European Application No. 14155521.9 dated Oct. 21, 2015; 6 pages.
Search Report for European Application No. 14155523.5 dated Oct. 21, 2015; 7 pages.
Office Action for related Chinese Application No. 201410054334.7 dated Mar. 7, 2016 with English translation; 12 pages.

* cited by examiner

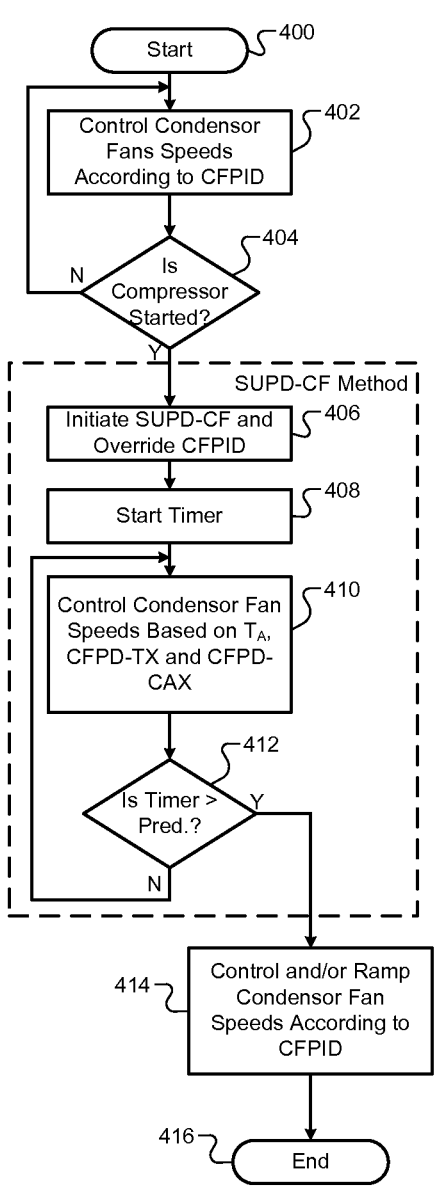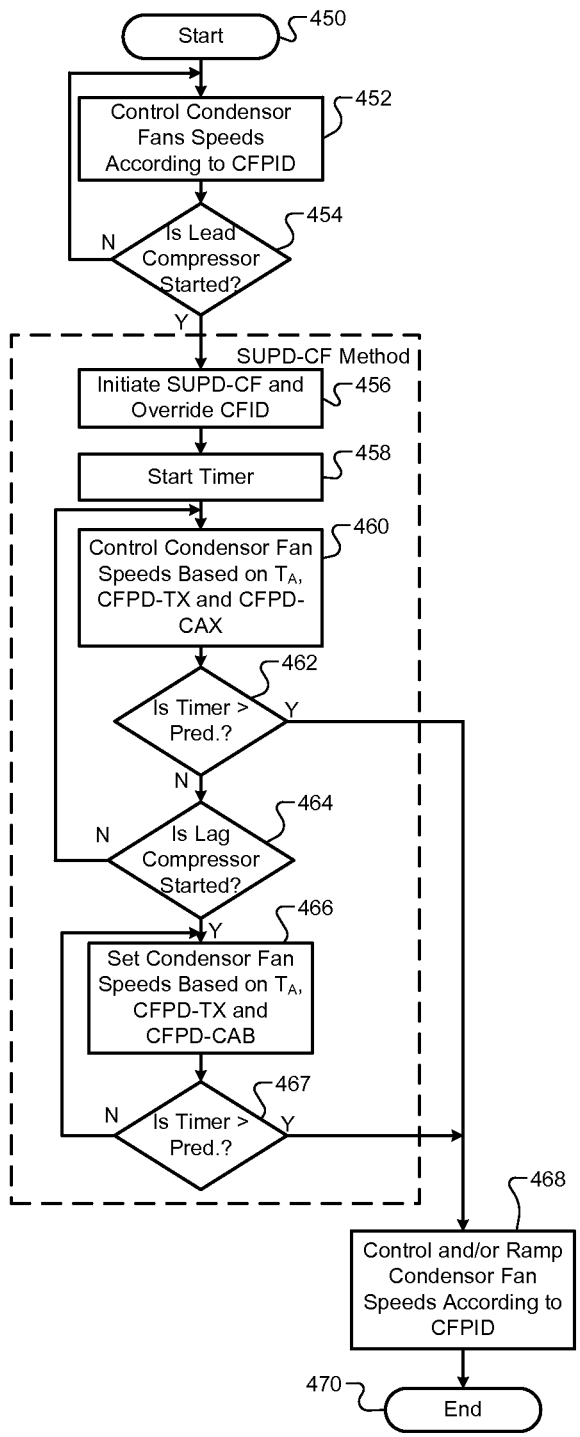
FIG. 15
FIG. 16

SCROLL COMPRESSOR DIFFERENTIAL PRESSURE CONTROL DURING COMPRESSOR SHUTDOWN TRANSITIONS

CROSS-REFERENCE TO RELATED APPLICATIONS

This application claims the benefit of U.S. Provisional Application No. 61/765,884, filed on Feb. 18, 2013. The entire disclosure of the above application is incorporated herein by reference.

FIELD

The present disclosure relates to high-efficiency cooling systems, and more particularly, to pressure control systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cooling systems have applicability in a number of different applications where a fluid is to be cooled. The fluid may be a gas, such as air, or a liquid, such as water. Example applications are heating, ventilation, air conditioning (HVAC) systems that are used for cooling spaces where people are present such as offices and data center climate control systems. A data center may refer to a room having a collection of electronic equipment, such as computer servers.

In FIG. 1, an air conditioner 50 that may be used in, for example, a computer room is shown. The air conditioner 50 includes a cooling circuit 51 and a cabinet 52. The cooling circuit 51 is disposed in the cabinet 52 and includes an evaporator 54, an air moving device 56, a compressor 58, a condenser 60, and an expansion valve 62. The evaporator 54, compressor 58, condenser 60 and expansion valve 62 are connected in a closed loop in which a cooling fluid (e.g., phase change refrigerant) circulates. The evaporator 54 may include a V-coil assembly with multiple cooling slabs to provide increased cooling capacity. The evaporator 54 receives the cooling fluid and cools air passing through openings in evaporator 54. The air moving device 56 (e.g., a fan or squirrel cage blower) draws the air from an inlet (not shown) in the cabinet 52 and through the evaporator 54. The cooled air is directed from the evaporator 54 and out a plenum 64 in the cabinet 52.

The compressor 58 circulates the cooling fluid through the condenser 60, the expansion valve 62, the evaporator 54 and back to the compressor 58. The compressor 58 may be, for example, a scroll compressor. A scroll compressor may be a fixed capacity or digital variable capacity compressor. A scroll compressor typically includes two offset spiral disks. The first spiral disk is a stationary disk or scroll. The second spiral disk is an orbiting scroll. The cooling fluid is received at an inlet of the scroll compressor, trapped between the offset spiral disks, compressed, and discharged at a center (or outlet) towards the condenser 60. The condenser 60 may be a micro-channel condenser that cools the cooling fluid received from the compressor 58. The expansion valve 62 may be an electronic expansion valve and expand the cooling fluid out of the condenser 60 from, for example, a liquid to a vapor.

Although a single cooling circuit is shown in FIG. 1, multiple cooling circuits may be included and arranged in series to provide multiple stages of cooling. The cooling circuits may minimize energy consumption by reducing pressure ratios of the compressors. A pressure difference of a compressor refers to a difference between an inlet or suction pressure and an outlet or head pressure of the compressor. To increase operating efficiencies, the pressure differences may be further reduced based on established room conditions. The decrease in the pressure differences can lead to the stationary scrolls of the compressors separating from the orbiting scrolls. This results in unpredictable and undirected "unloading" of the compressors. A compressor is unloaded when the compressor is in a minimal vapor displacement condition (or transfers a minimal amount of fluid). The unloading of the compressors reduces the cooling capacity and temperature control stability of the cooling circuits.

At elevated return air temperatures (90+° F./32.2+° C.) compressor efficiency gains can be maximized. At these temperatures and when, for example, Refrigerant 410A is used and is at steady-state, operating pressure can result in undirected unloading of the scroll compressors.

An air conditioning system may include one or more compressors including a tandem set of compressors. The tandem set may include two or more compressors of equal or unequal volumetric displacement. A first compressor may be a digital pulse width modulation (PWM) scroll compressor that receives a PWM percentage signal to control capacity of the first compressor. As an alternative, the first compressor may be any variable capacity scroll compressor that receives a proportional percentage signal to control compressor speed. A second compressor may be a fixed capacity scroll compressor with simply ON/OFF capacity control. Additional compressors may be included in the tandem set. The additional compressors may be digital PWM scroll compressors, variable speed scroll compressors, and/or fixed capacity scroll compressors. Suction and discharge lines of the compressors in the tandem set may be piped in parallel to form the tandem set.

The tandem set offers an energy efficient configuration by allowing the digital PWM scroll compressor to be activated prior to the fixed capacity scroll compressor. This effectively allows the tandem set to provide partial-displacement operation with a reduced volumetric displacement/capacity until additional capacity is needed from the fixed capacity scroll compressor. While this partial-displacement operation is efficient, providing this operation in conjunction with a condenser at low ambient temperatures and an evaporator at high ambient temperatures can cause prolonged operation at a minimum compressor pressure difference. This low-pressure difference can also cause an unloaded compressor condition, which can lead to reduced cooling capacity of the compressors.

The unloaded compressor condition at startup is prevalent at low-outdoor ambient temperatures (e.g., temperatures less than 40° F./4.4° C.). As an outdoor ambient temperature descends and an incoming air temperature to the condenser is reduced, the duration of unloaded time may be increased.

The compressor configuration of the tandem set also allows for energy efficient temperature control by providing a wide range of capacity modulation for a cooling circuit of an air conditioning system. However, when an incoming load to the tandem set is reduced such that the fixed capacity scroll compressor is deactivated, a rate of volumetric displacement for the tandem set can be reduced by at least 50%. This can cause the pressure difference of the tandem set to temporarily decrease to a low-pressure difference. When the pressure difference is less than a predetermined pressure difference, the suction pressures and the head pressures of the compressors are approximately equal to each other, resulting in an unloaded condition. This reduces the ability of the tandem set to move vapor, which reduces cooling capacity.

SUMMARY

This section provides a general summary of the disclosure, and is not a comprehensive disclosure of its full scope or all of its features.

In an aspect, a method is provided and includes determining whether an OFF criterion is satisfied for a lag compressor of a tandem set of scroll compressors. The tandem set of scroll compressors comprises a lead compressor and the lag compressor. At least one process is initiated when the OFF criterion is satisfied. The lag compressor is maintained in an ON state for a predetermined period subsequent to the OFF criterion being satisfied. The at least one process includes at least one of: (i) operating the lead compressor at a maximum level; (ii) overriding a motor overload protection method; and (iii) overriding a PID method to reduce a speed of a condenser fan. The motor overload protection method protects motors of the lead compressor and the lag compressor. The PID method controls the speed of the condenser fan.

In another aspect, a method is provided and includes determining a pressure difference across a scroll compressor of a cooling system. The pressure difference is compared to a minimum differential pressure value. Pressure differences across the scroll compressor that are less than the minimum differential pressure value are associated with undirected unloading the scroll compressor. Parameters including a head pressure set point value and an absolute minimum pressure value are increased when the pressure difference is less than the minimum differential pressure value. Subsequent to the increasing of the parameters, the parameters are decreased when the pressure difference is greater than a sum of the minimum differential pressure value and a hysteresis value.

In another aspect, a method is provided and includes determining a pressure difference across a scroll compressor of a cooling system. The pressure difference is compared to a minimum differential pressure value. Pressure differences across the scroll compressor that are less than the minimum differential pressure value are associated with undirected unloading the scroll compressor. Parameters including an evaporator fan decrease value, an evaporator fan minimum value, a compressor increase value, and a compressor maximum value are decreased when the pressure difference is less than the minimum differential pressure value. Subsequent to the decreasing of the parameters, the parameters are increased when the pressure difference is greater than a sum of the minimum differential pressure value and a hysteresis value In another aspect, a method is provided and includes determining a pressure difference across a scroll compressor of a cooling system. The pressure difference is compared to a first minimum differential pressure value. Pressure differences across the scroll compressor that are less than the first minimum differential pressure value are associated with undirected unloading the scroll compressor. A first method is started to increase first parameters when the pressure difference is less than the first minimum differential pressure value. The pressure difference is compared to a second minimum differential pressure value. Pressure differences across the scroll compressor that are less than the second minimum differential pressure value are associated with unloading the scroll compressor. A second method is started to decrease second parameters when the pressure difference is less than the second minimum differential pressure value.

In another aspect, a method is provided and includes determining a cooling value. The cooling value is compared to an activation point of a lead compressor. The lead compressor is in a tandem set of scroll compressors of a cooling system. The tandem set of compressors includes a lag compressor. The lead compressor is activated when the cooling value is greater than the activation point. The lag compressor is activated subsequent to activating the lead compressor. The method further includes determining whether conditions exist including: (i) an alarm associated with the lag compressor is generated; and (ii) the lead compressor is deactivated. The lag compressor is deactivated when at least one of the conditions exists in the cooling system.

In another aspect, a method is provided and includes controlling a condenser fan at a first speed according to a proportional integral derivative (PID) method. The method further includes determining whether a scroll compressor in a tandem set of compressors in a cooling system has been activated. The PID method is overridden when the scroll compressor has started including controlling the condenser fan at a second speed based on an ambient temperature, a predetermined temperature and a first predetermined speed for the condenser fan. The second speed is less than the first speed and greater than zero.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5A:
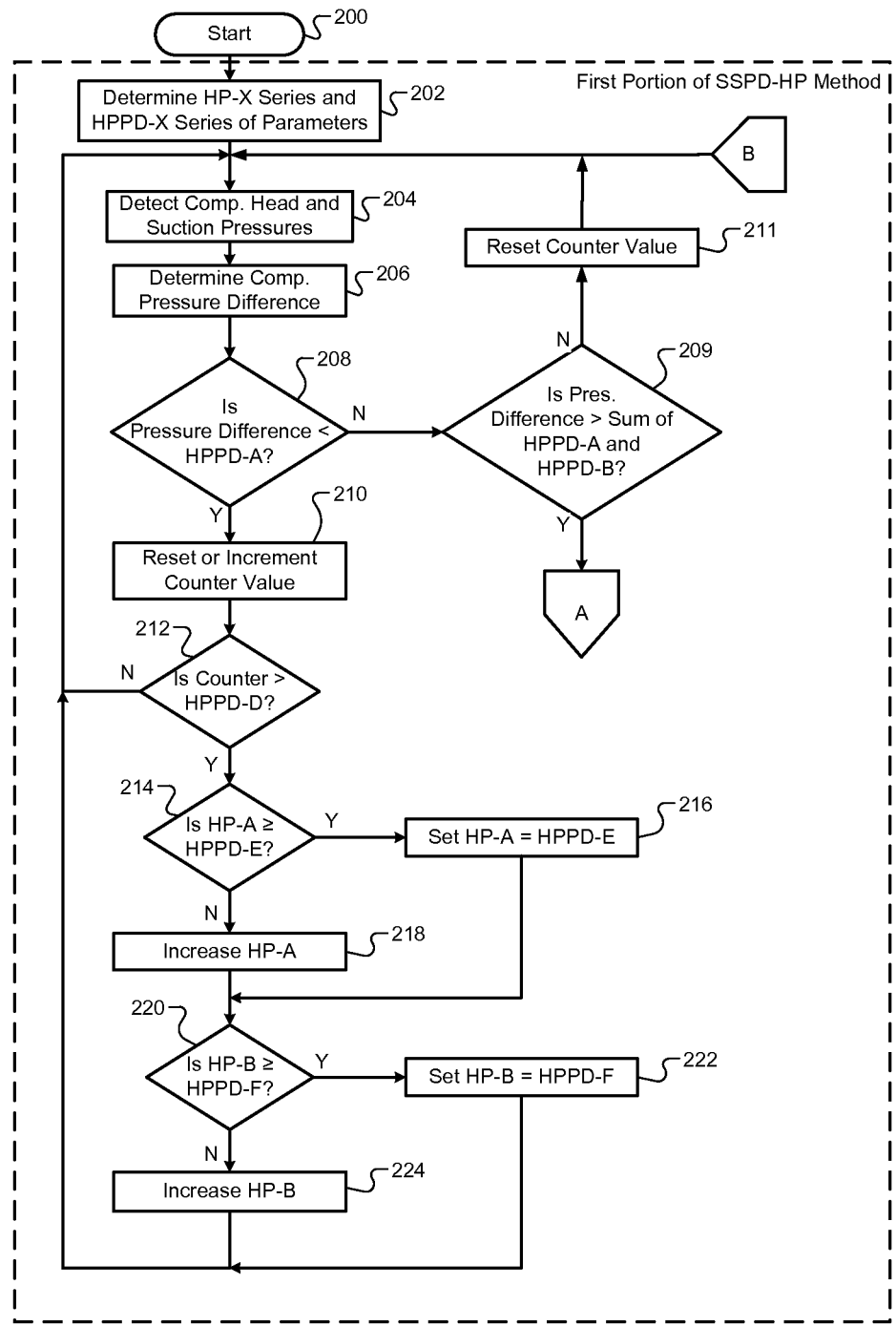
Figure 5B:
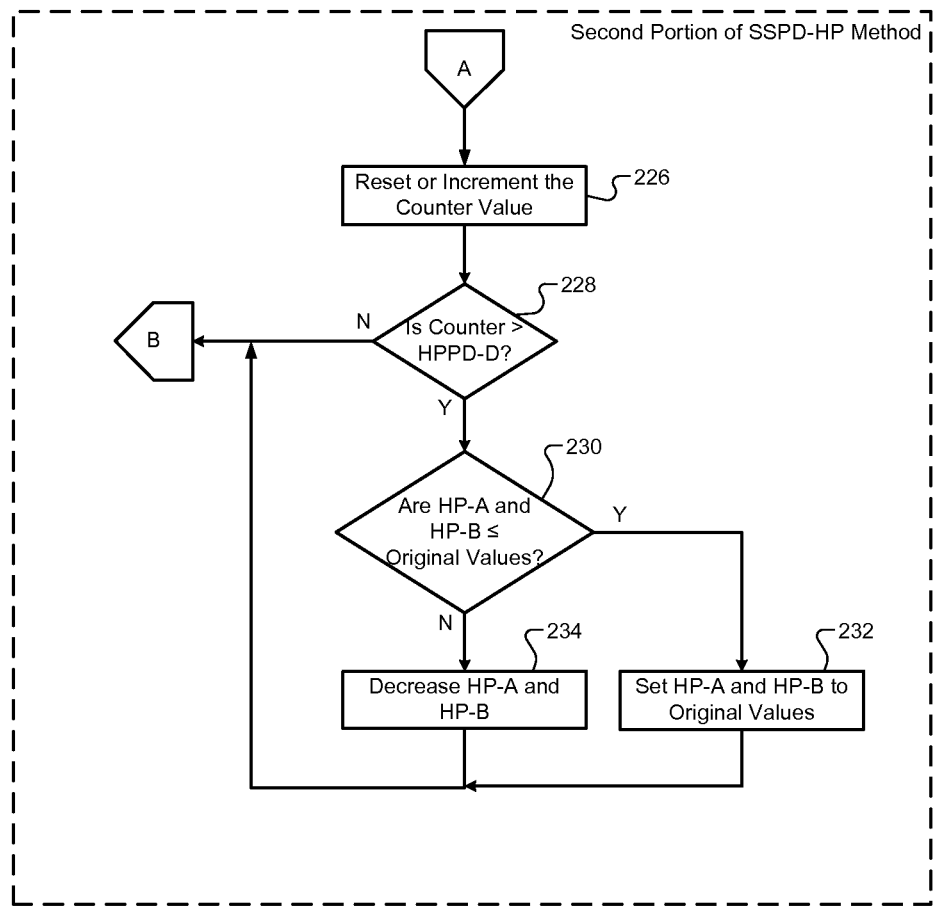
Figure 6:
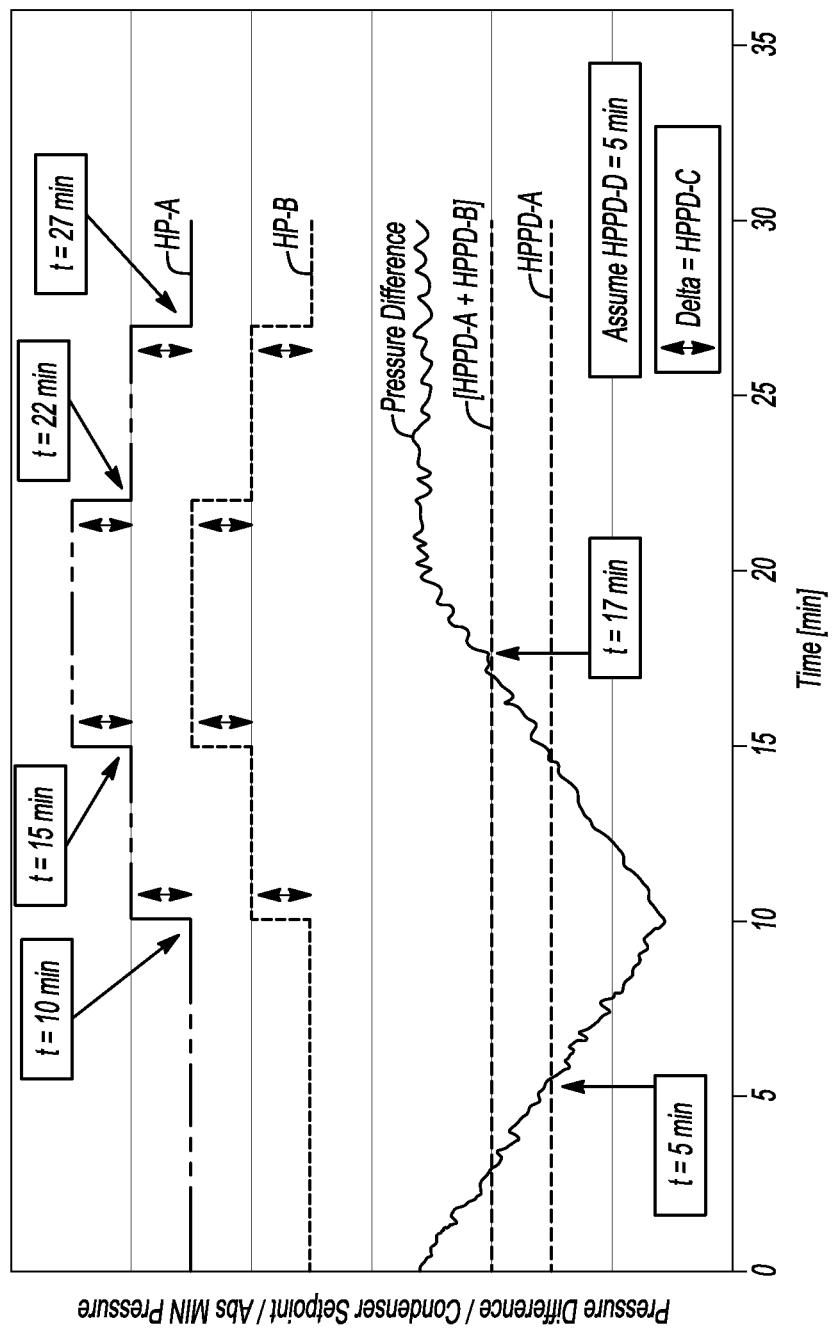
Figure 7A:
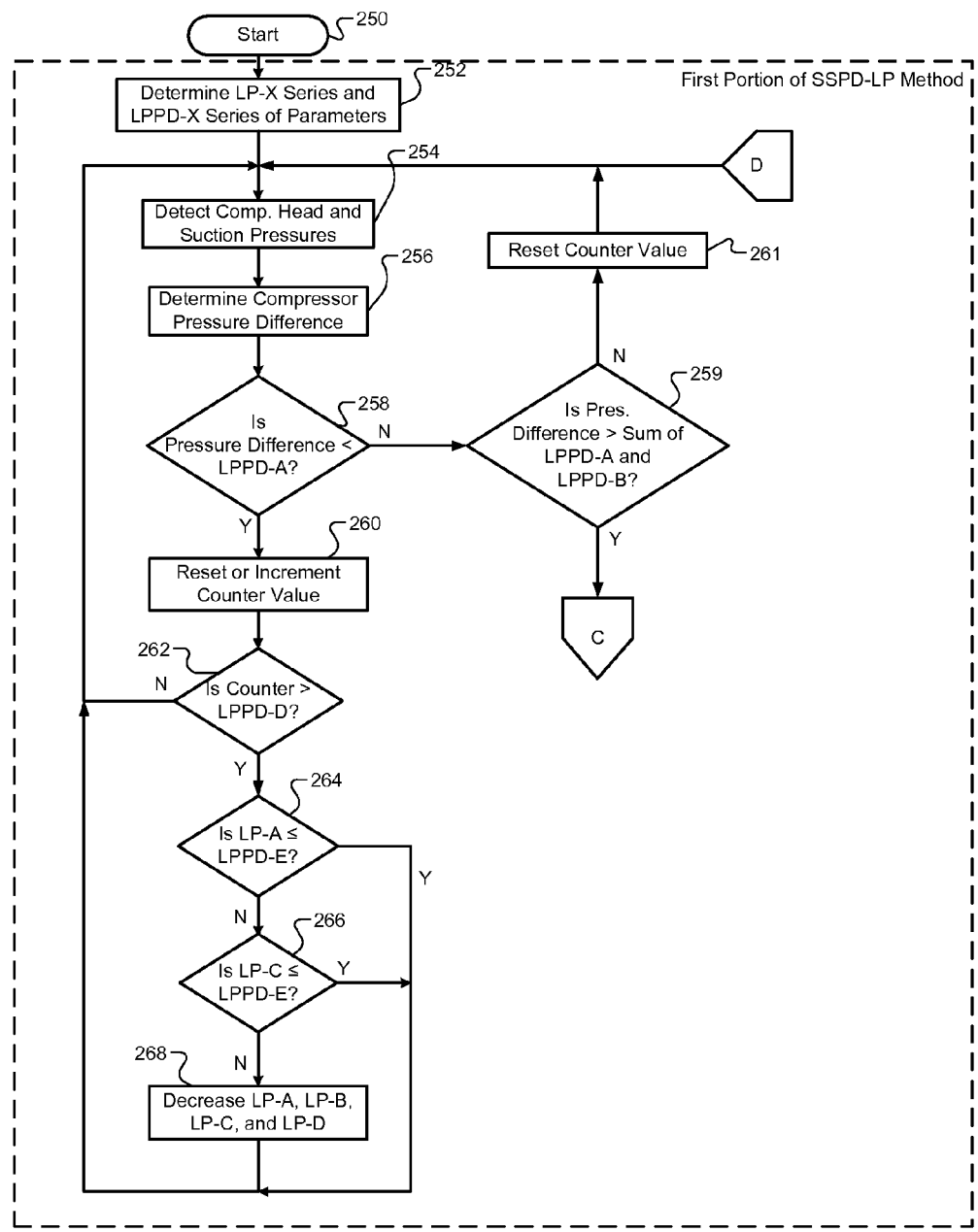
Figure 7B:
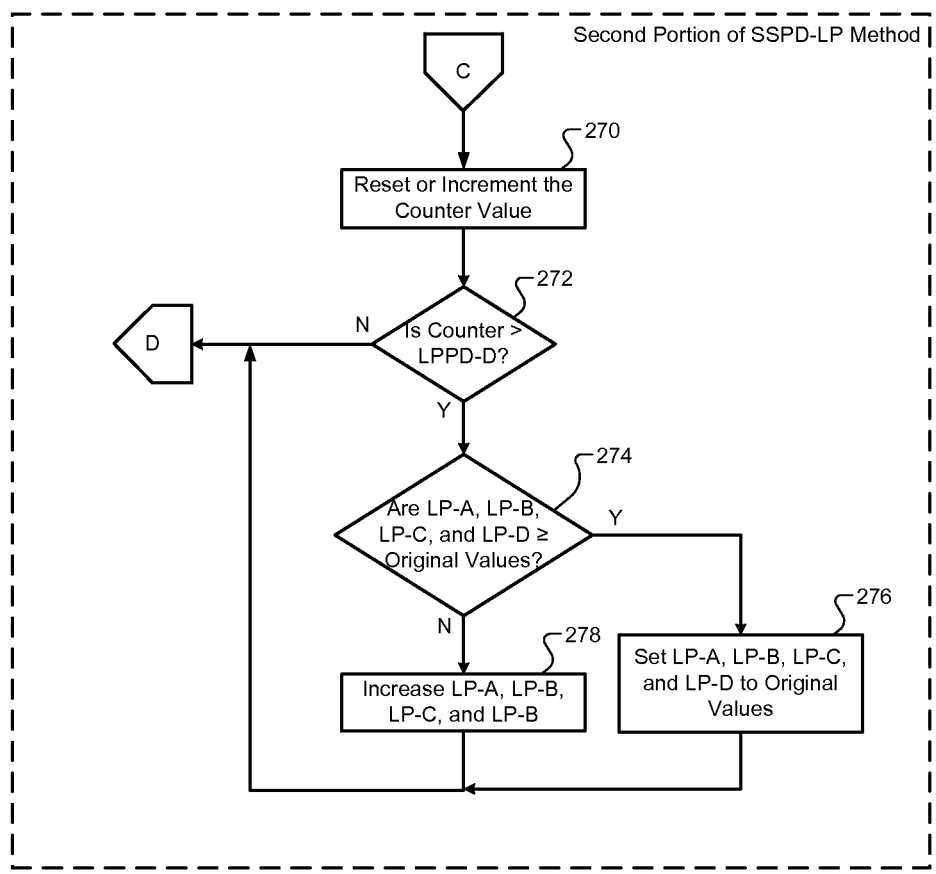
Figure 8:
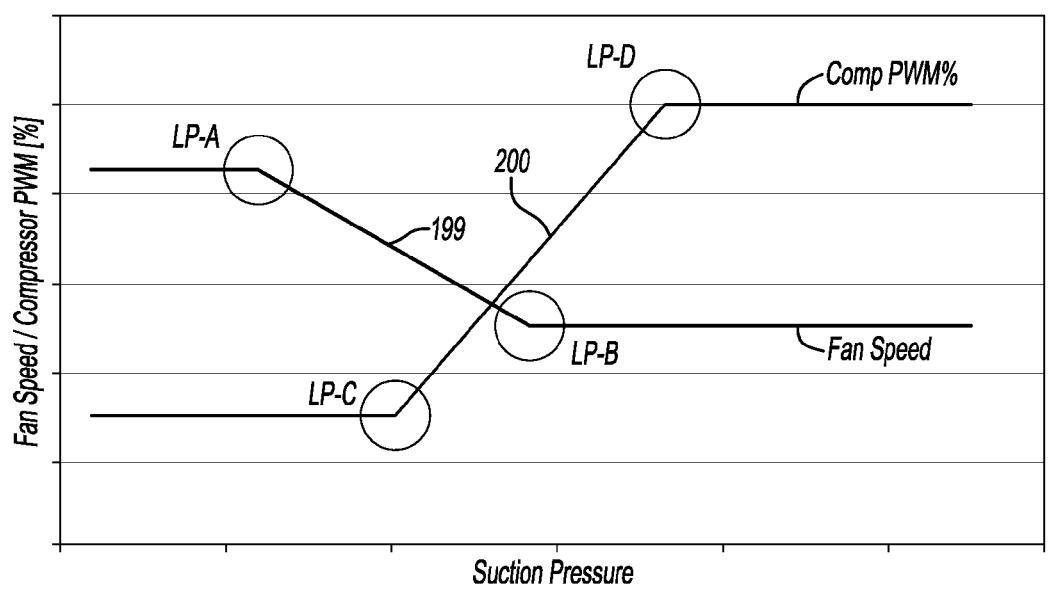
Figure 9:
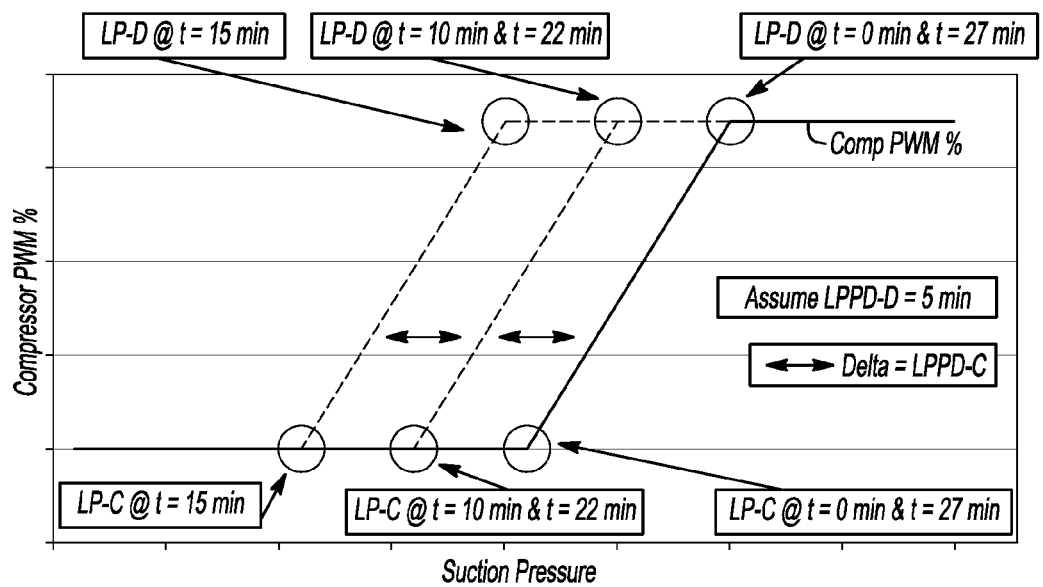
Figure 10:
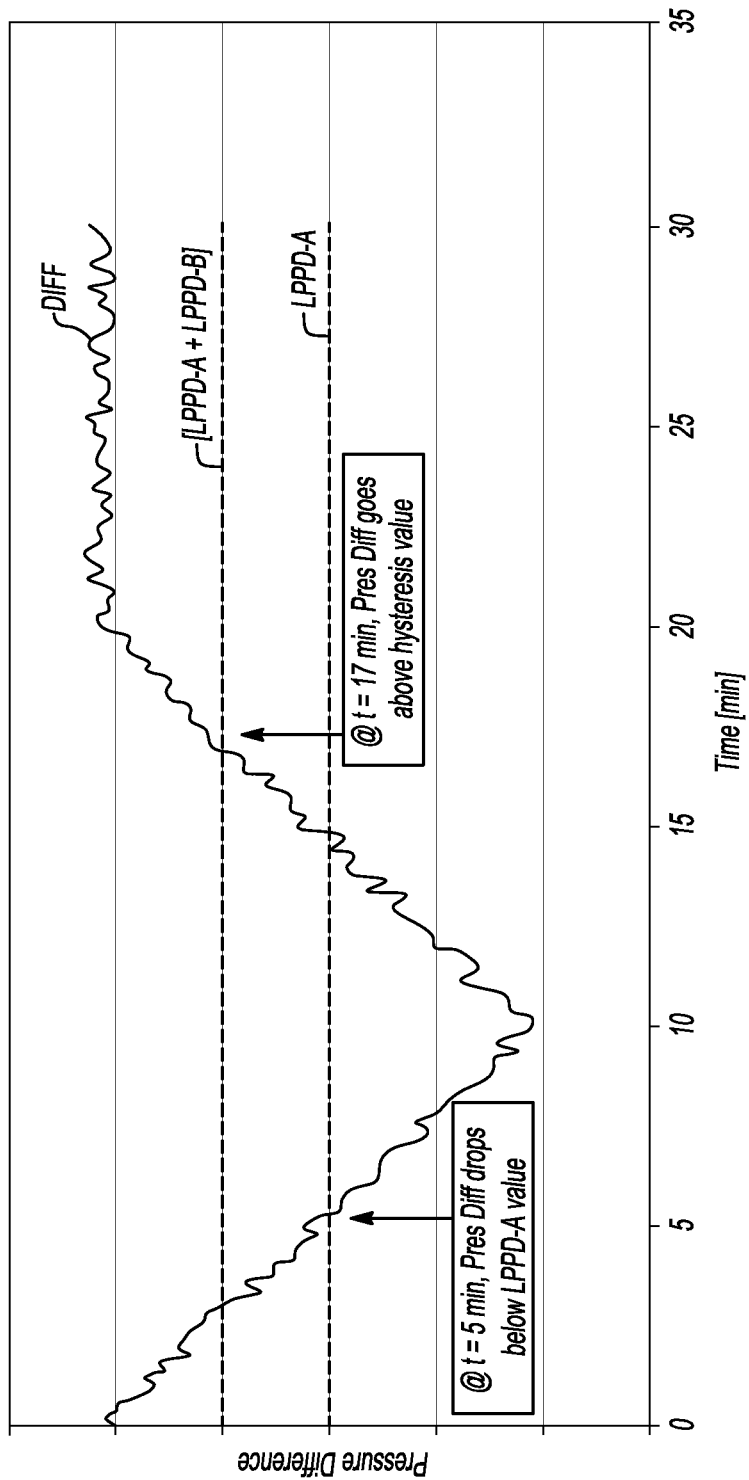
Figure 11:
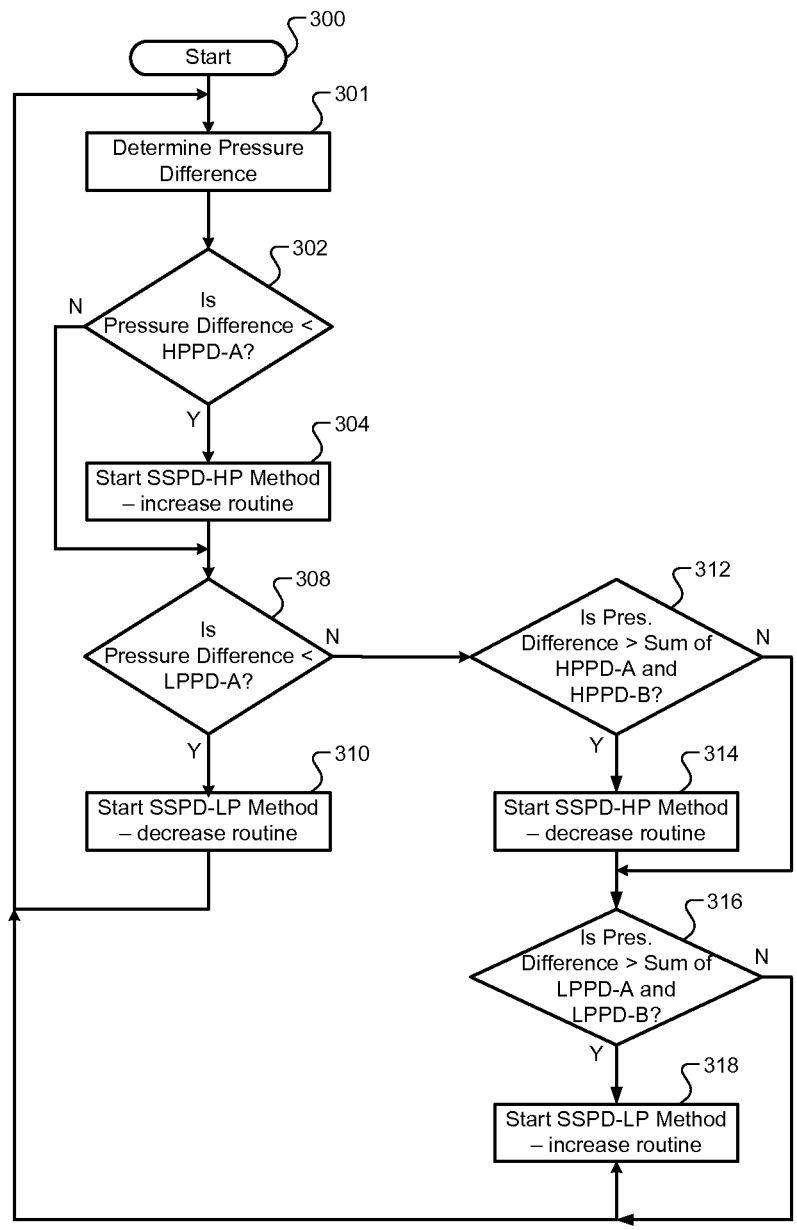
Figure 12:
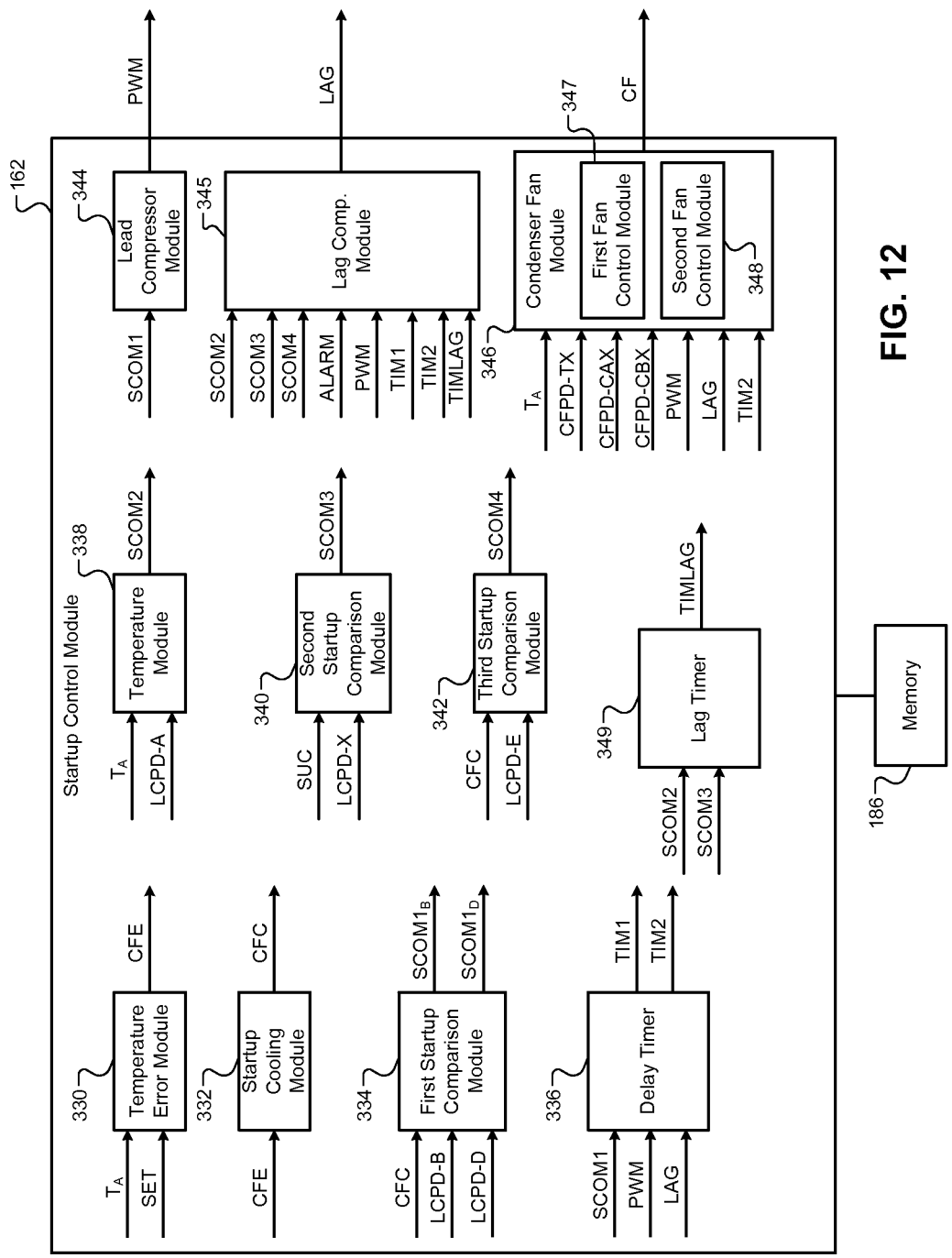
Figure 13:
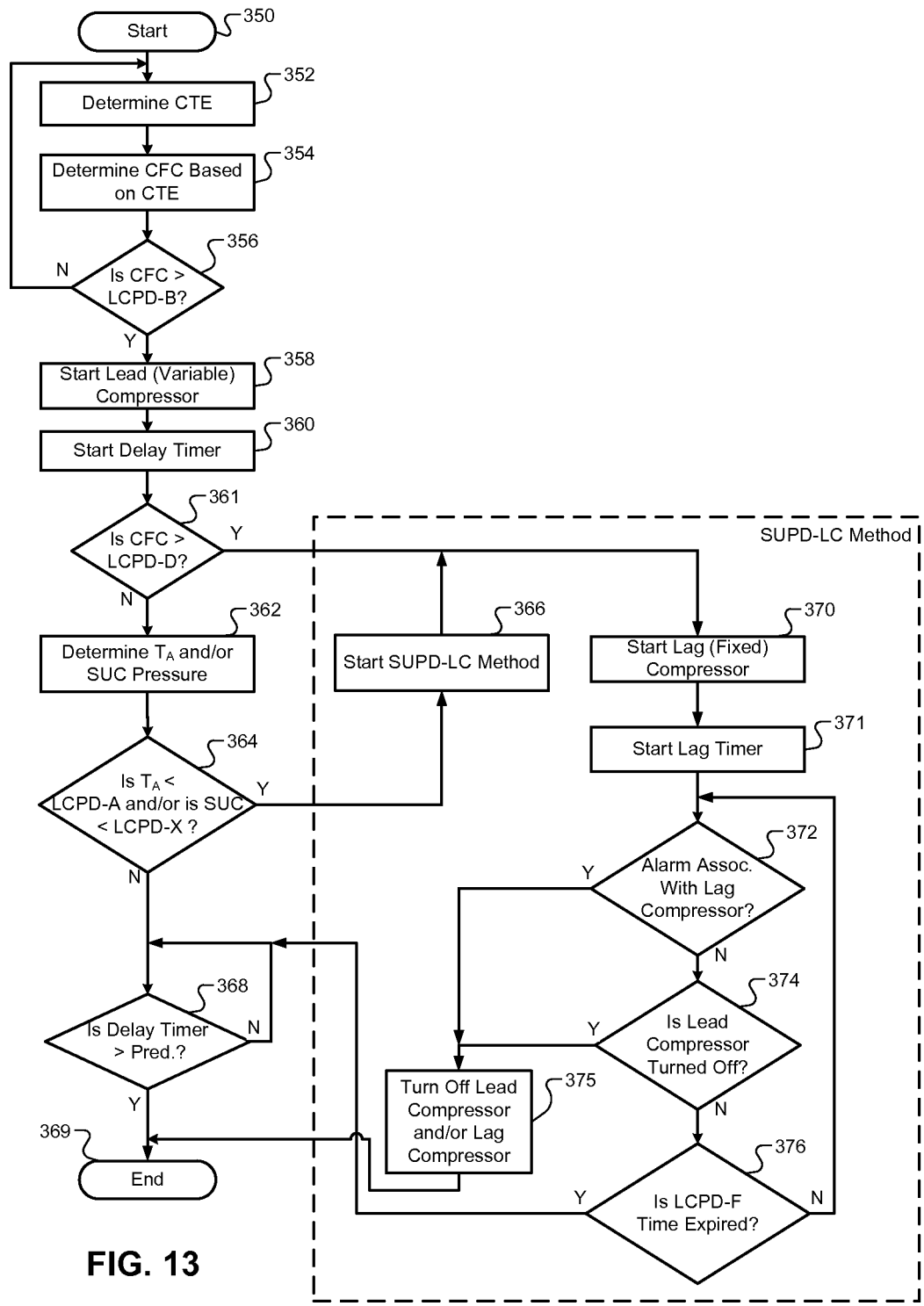
Figure 14:
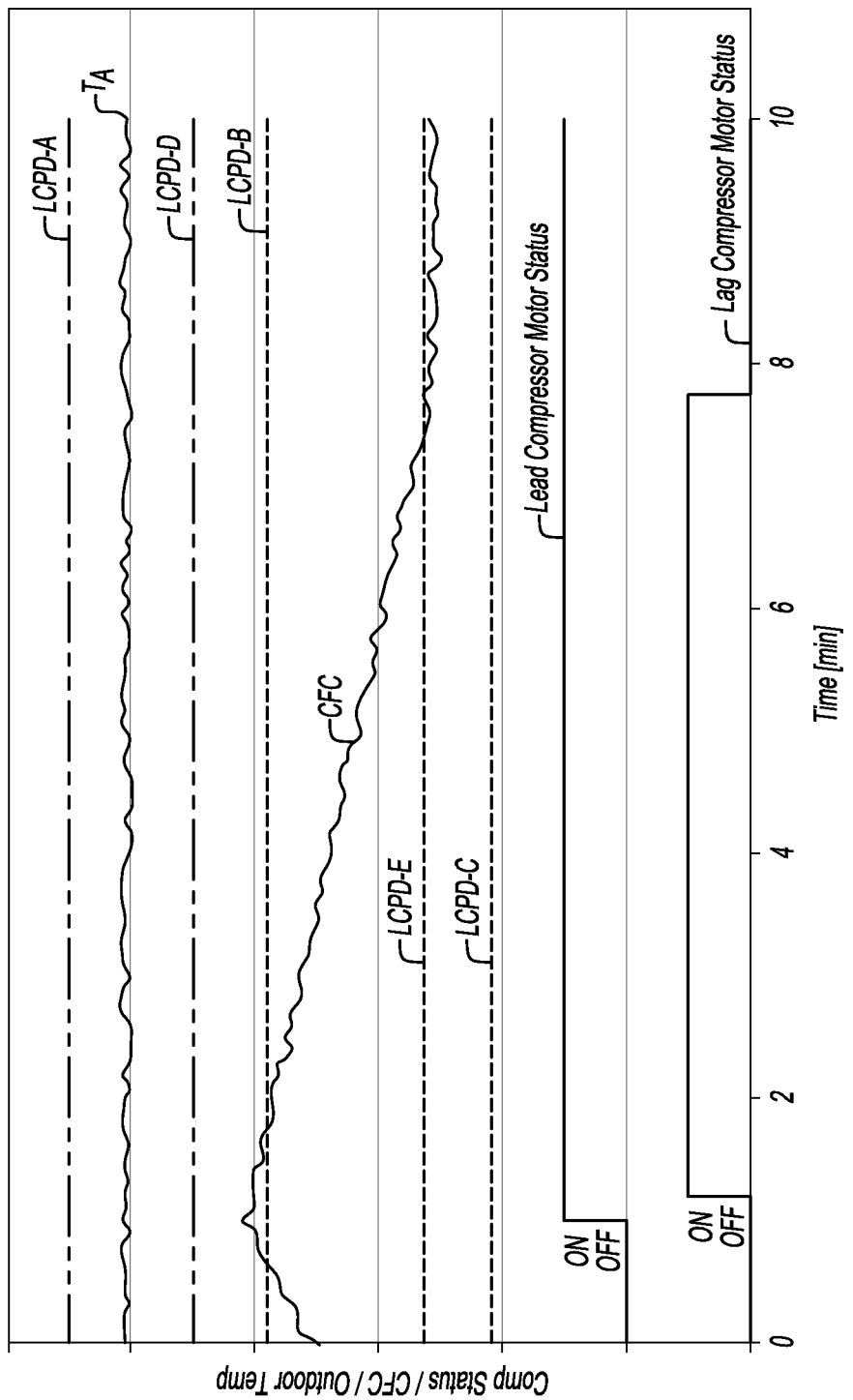
Figure 17:
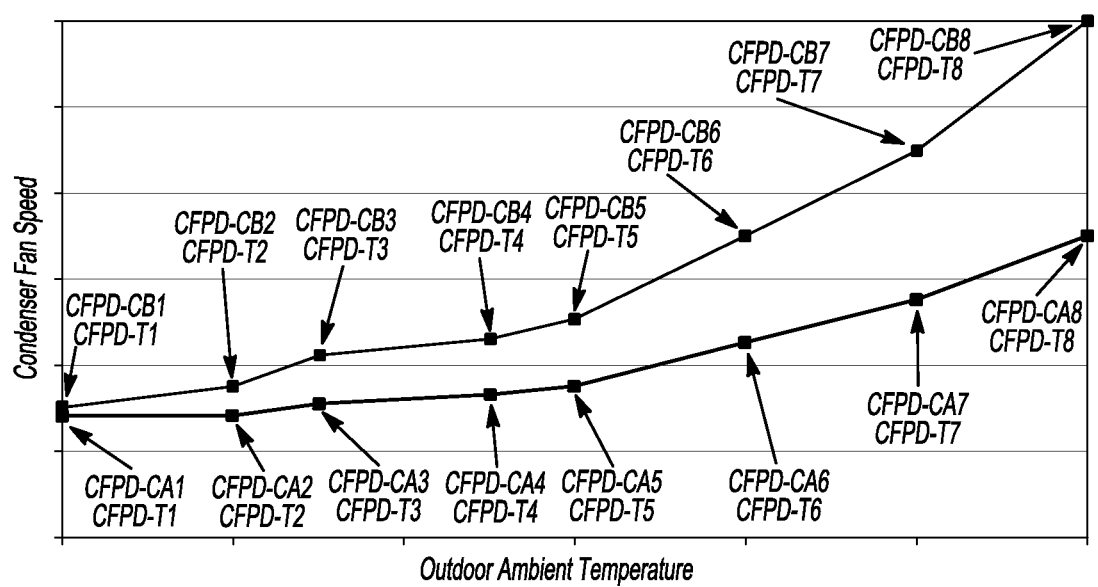
Figure 18:
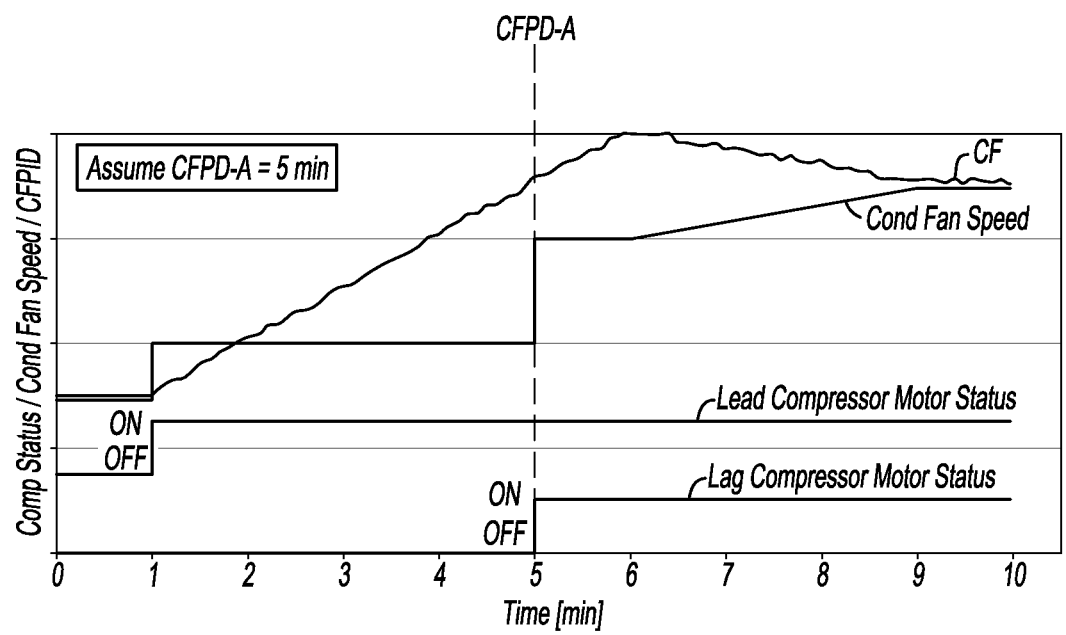
Figure 19:
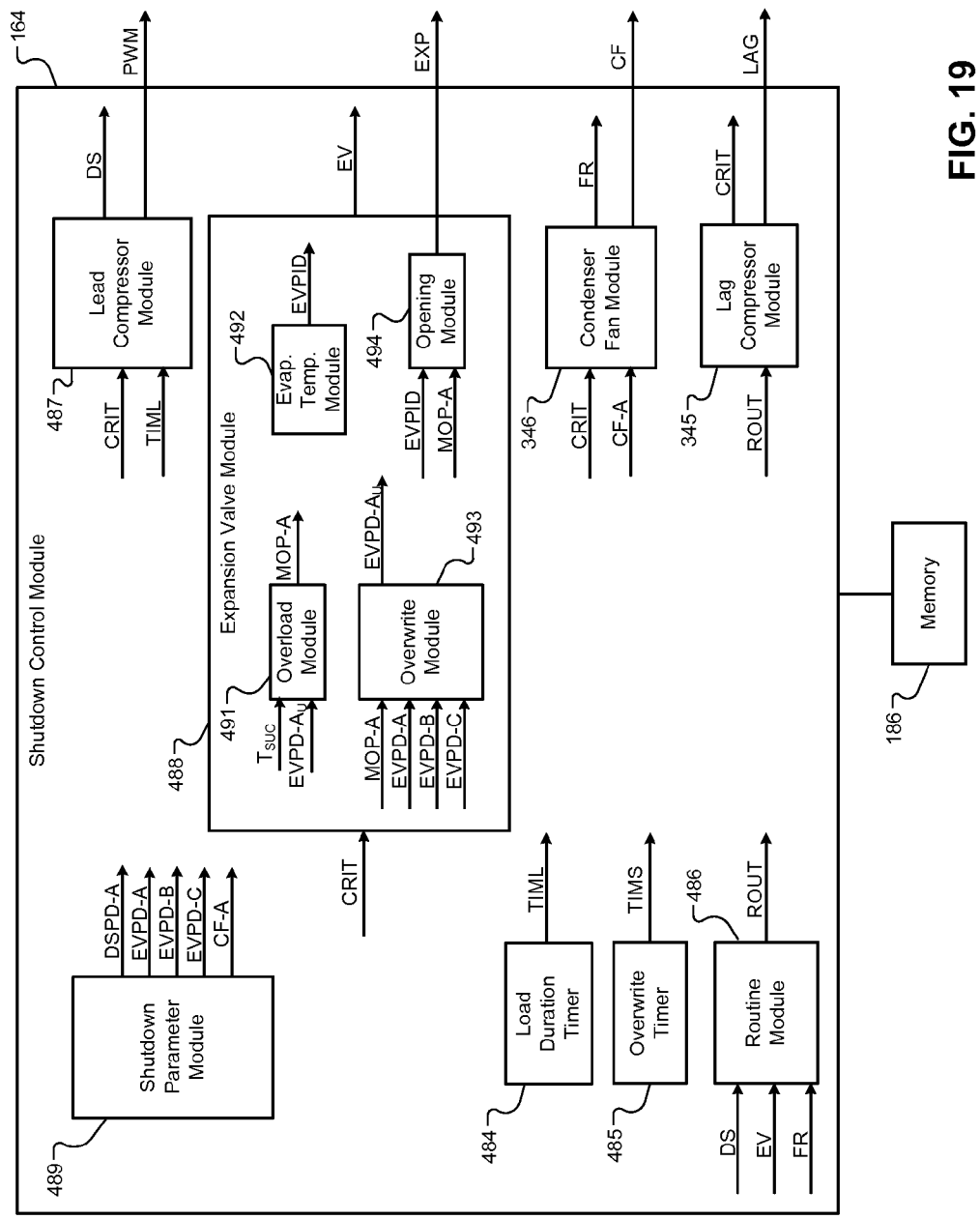
Figure 20:
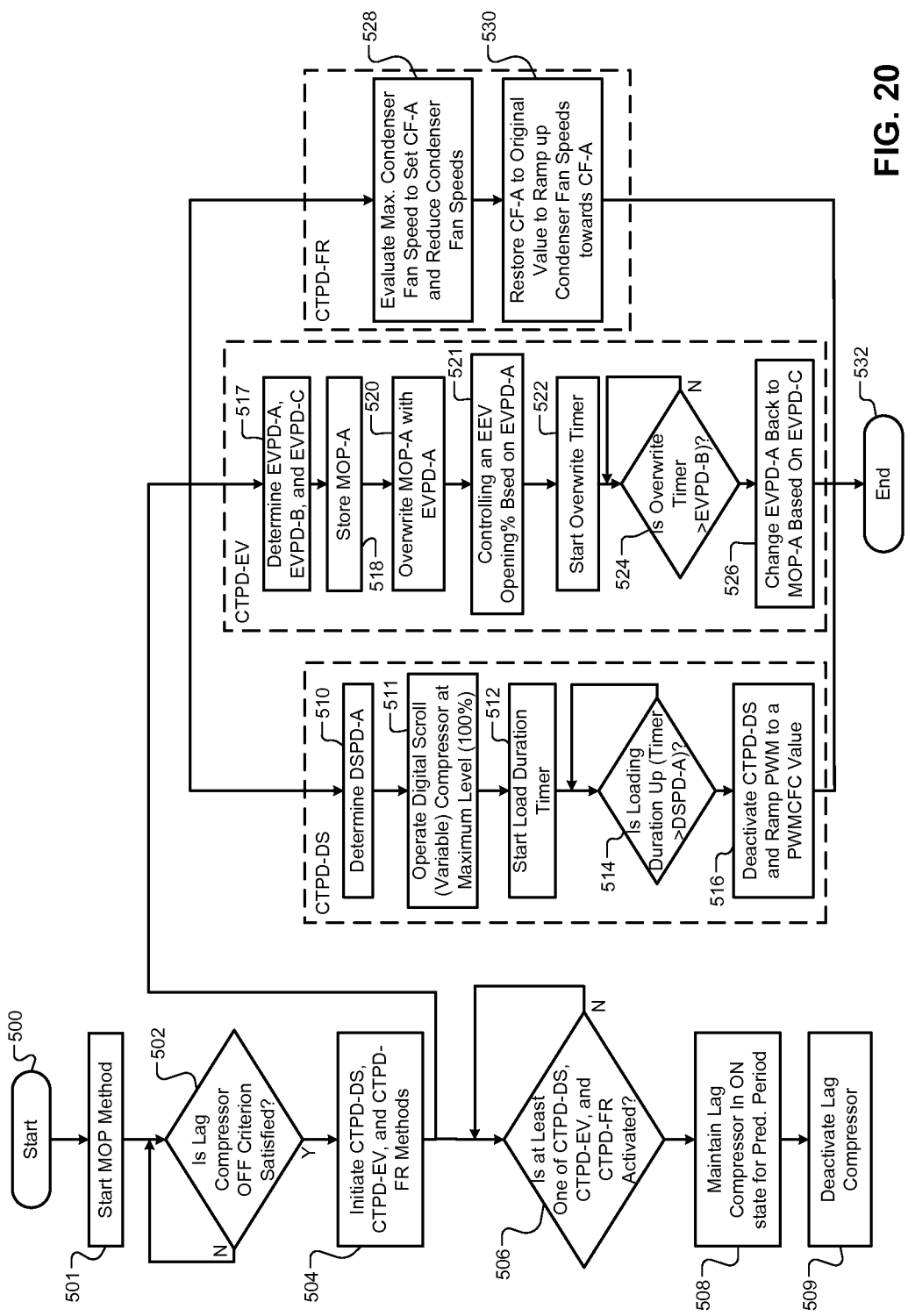
Figure 21:
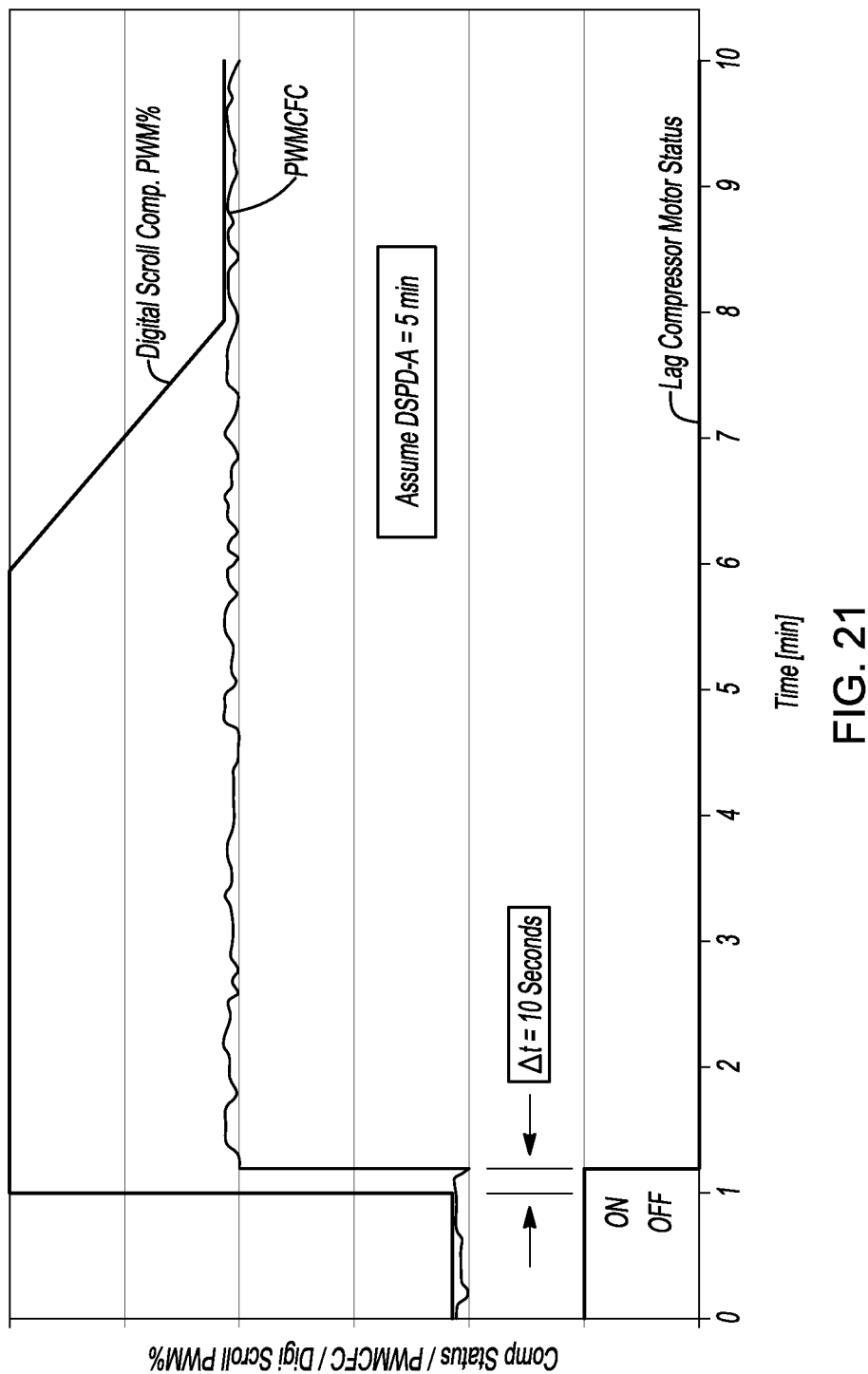
Figure 22:
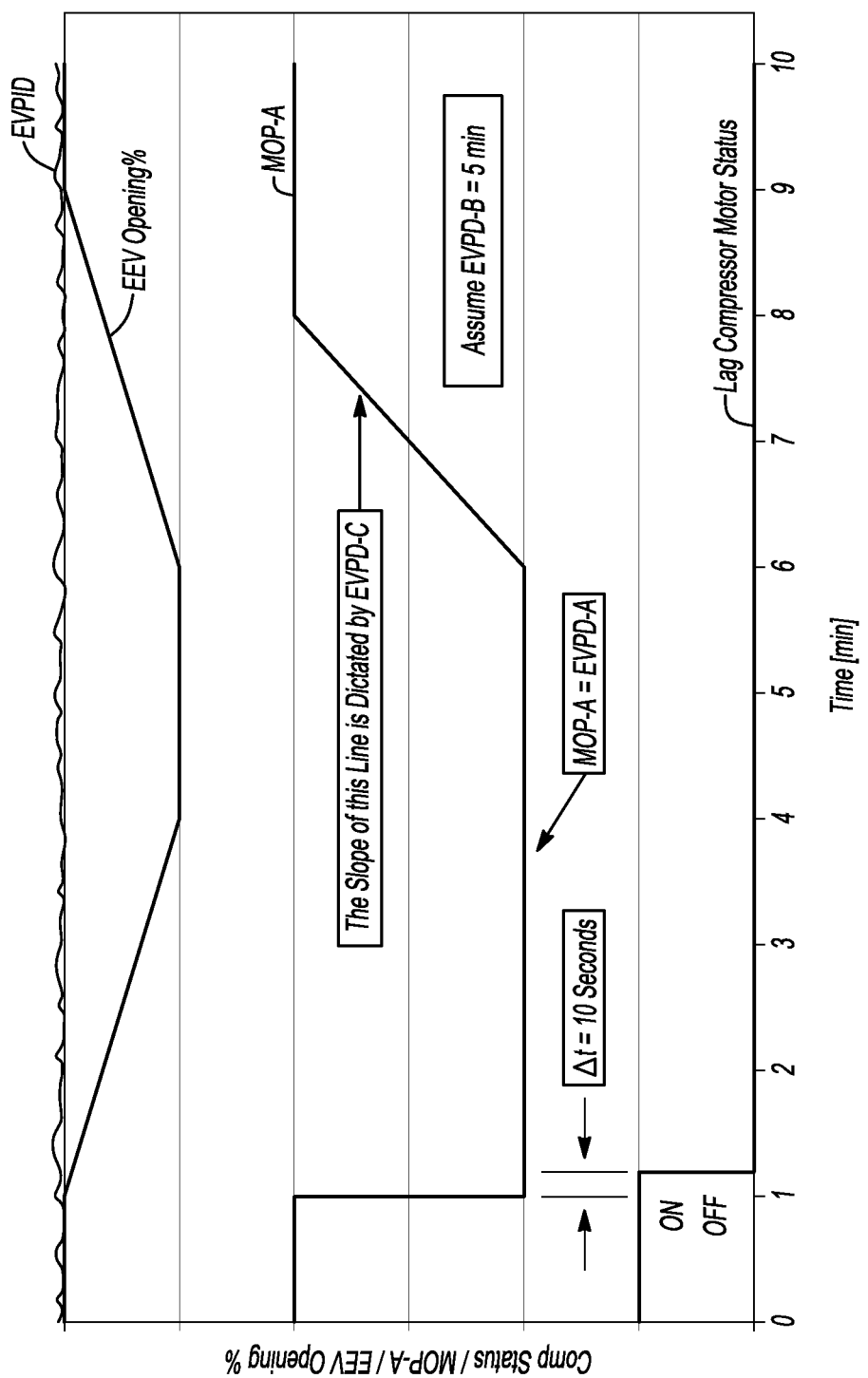
Figure 23:
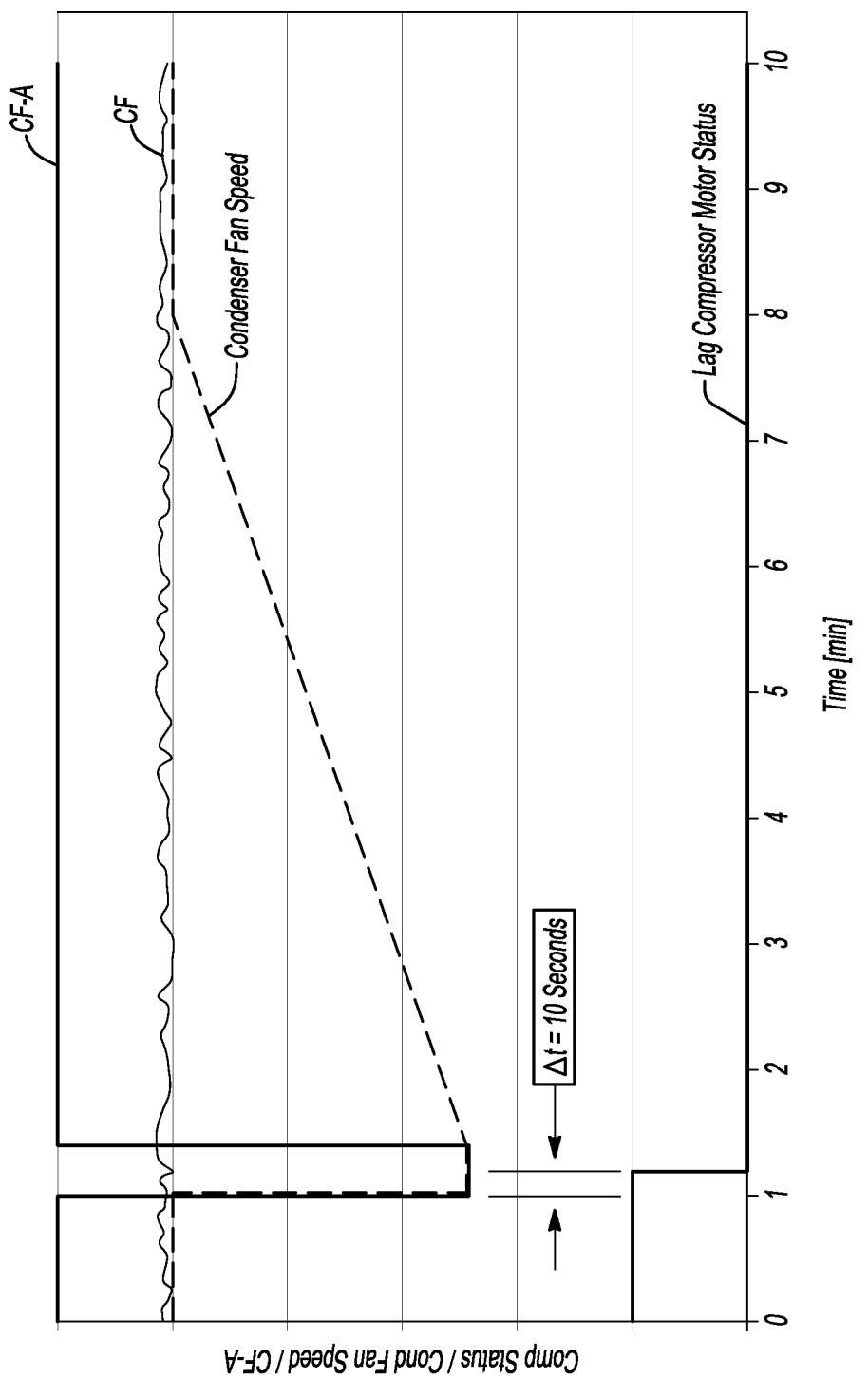

FIGS. 5A and 5B provide a logic flow diagram illustrating a head pressure management method in accordance with an aspect of the present disclosure;

FIG. 6 is a pressure difference plot associated with the head pressure management of FIGS. 5A and 5B;

FIGS. 7A and 7B provide a logic flow diagram illustrating a suction pressure management method in accordance with an aspect of the present disclosure;

FIG. 8 is an evaporator fan speed and compressor duty cycle plot associated with the suction pressure management of FIGS. 7A and 7B;

FIG. 9 is a compressor plot illustrating pulse width modulation duty cycle percentages in accordance with an aspect of the present disclosure;

FIG. 10 is a pressure difference plot associated with the suction pressure management of FIGS. 7A and 7B;

FIG. 11 is a logic flow diagram illustrating a dual-pressure management method with evaporator fan and compressor motor control in accordance with an aspect of the present disclosure;

FIG. 12 is a functional block diagram of a startup control module in accordance with an aspect of the present disclosure;

FIG. 13 is a logic flow diagram illustrating a lag compressor based startup pressure difference method in accordance with an aspect of the present disclosure;

FIG. 14 is a compressor status and cooling value plot associated with the lag compressor based startup pressure difference method of FIG. 13;

FIG. 15 is a condenser fan based startup pressure difference method for use with non-tandem compressors in accordance with an aspect of the present disclosure;

FIG. 16 is a condenser fan based startup pressure difference method for use with tandem compressors in accordance with an aspect of the present disclosure;

FIG. 17 is a condenser fan speed interpolation-based plots for the methods of FIGS. 15 and 16;

FIG. 18 is a condenser fan speed plot for operation with tandem compressors in accordance with an aspect of the present disclosure;

FIG. 19 is a functional block diagram of a shutdown control module in accordance with an aspect of the present disclosure;

FIG. 20 is a logic flow diagram of a compressor transition pressure difference method in accordance with an aspect of the present disclosure; and FIG. 21 is a digital scroll plot for the method of FIG. 20;

FIG. 22 is an electronic expansion valve (EEV) plot for the method of FIG. 20; and FIG. 23 is a condenser fan speed plot for the method of FIG. 20.

Corresponding reference numerals indicate corresponding parts throughout the several views of the drawings.

DETAILED DESCRIPTION

Example embodiments will now be described more fully with reference to the accompanying drawings.

The following described embodiments prevent undirected unloading of scroll compressors. The embodiments include techniques to ensure that each pressure ratio or pressure difference of each scroll compressor is maintained at or above a predetermined level. A pressure ratio refers to a ratio between input and output pressures of one or more compressors. A pressure difference refers to a difference between input and output pressures of one or more compressors. The predetermined level may be greater than or equal to a level associated with undirected unloading an associated scroll compressor. Although the following techniques are primarily described with respect to pressure differences, pressure ratios may be determined and used.

Techniques generally used during operation of tandem scroll compressors are directed to FIGS. 2-11. Techniques generally used during startup of the scroll compressors are directed to FIGS. 2-3 and 12-18. Techniques generally used during shutdown of the tandem scroll compressors are directed to FIGS. 2-3 and 19-23.

Figure 1:
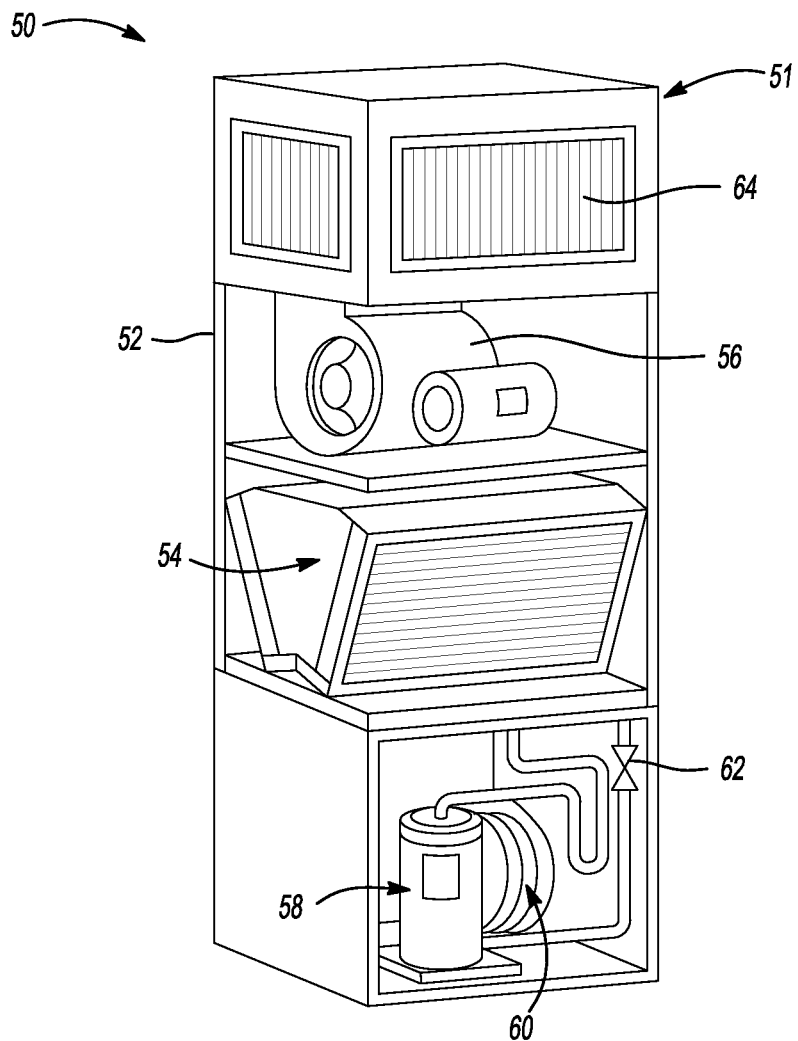
FIG. 1 is a perspective view of a prior art air conditioner.
Figure 2:
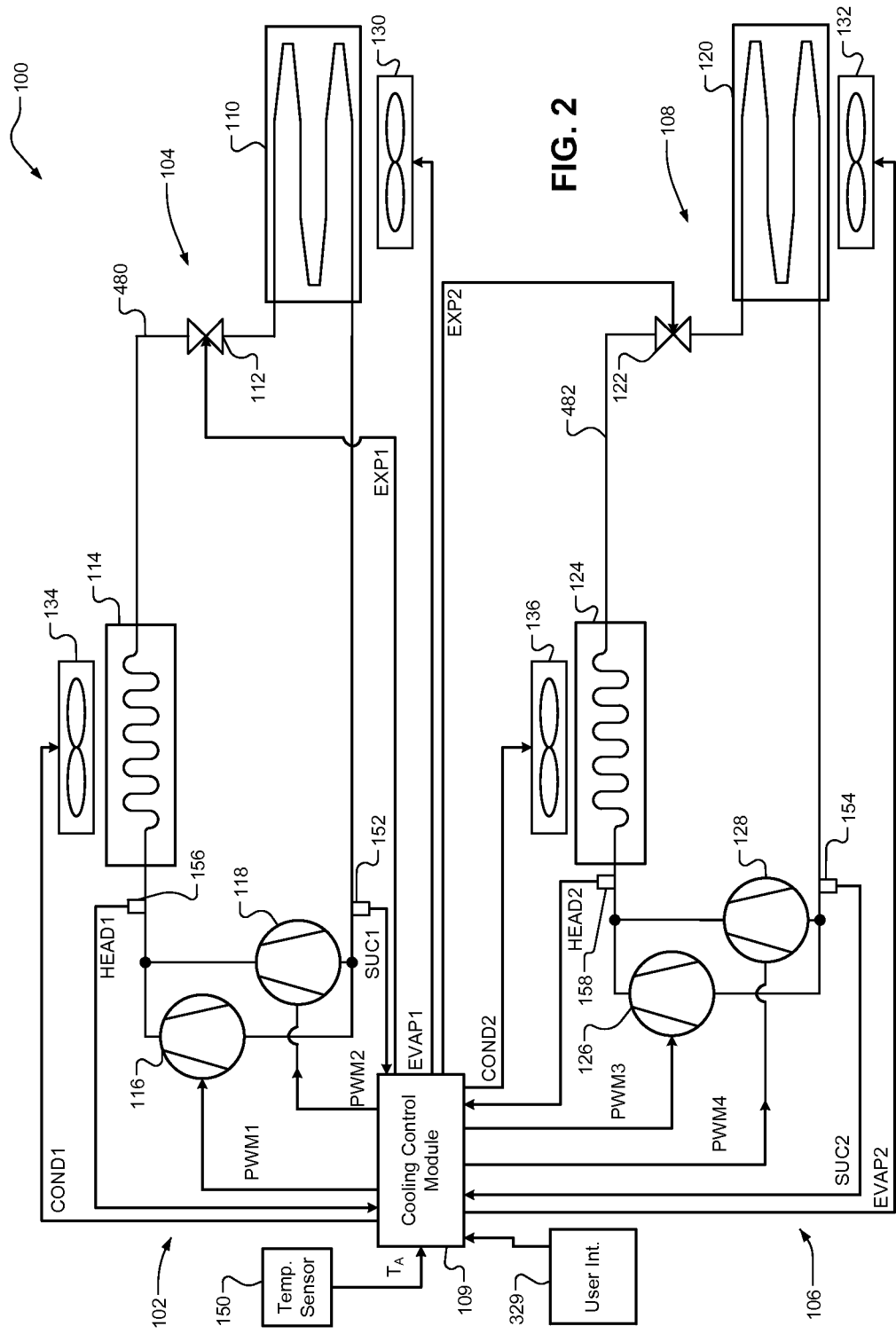
FIG. 2 is a schematic view of a multi-stage cooling system incorporating a cooling control module in accordance with an aspect of the present disclosure.

In FIG. 2, a schematic of a cooling system 100 is shown. The cooling system 100 includes an upstream cooling stage 102 with an upstream (or first) cooling circuit 104 and a downstream (or second) cooling stage 106 with a downstream cooling circuit 108. The cooling circuits are controlled via a cooling control module 109. The upstream cooling circuit 104 includes a first evaporator 110, a first expansion valve 112, a first condenser 114, a first compressor 116, and a second compressor 118. The downstream cooling circuit 108 includes a second evaporator 120, a second expansion valve 122, a second condenser 124, a third compressor 126, and a fourth compressor 128. The evaporators 110, 120 may have respective evaporator fans 130, 132. Although multiple evaporators and respective evaporator fans are shown, one or more evaporators and one or more evaporator fans may be included. One or more evaporator fans may be shared by one or more evaporators. The condensers 114, 124 have respective condenser fans 134, 136.

The cooling control module 109 may generate condenser fan signals COND1. COND2, evaporator fan signals EVAP1, EVAP2, expansion valve signals EXP1, EXP2, and compressor signals PWM1, PWM2, PWM3, PWM4 to control the fans 130, 132, 134, 136, expansion valves 112, 122, and the compressors 116, 118, 126, 128.

The cooling control module 109 may control the fans 130, 132, 134, 136, the expansion valves 112, 122, and/or the compressors 116, 118, 126, 128 based on signals from various sensors. The sensors may include, for example, an ambient temperature sensor 150, suction pressure sensors 152, 154, and/or head pressure sensors 156, 158. The ambient temperature sensor 150 may be an outdoor ambient temperature sensor and generate an ambient temperature signal $T_A$. The pressure sensors 152, 154 generate suction pressure signals SUC1, SUC2 and detect pressures of fluid received by the compressors 116, 118, 126, 128. The head pressure sensors 156, 158 generate head pressure signals HEAD1, HEAD2 and may detect pressures of fluid out of the compressors 116, 118, 126, 128. The head pressure sensors 156, 158 may be located anywhere between the compressors 116, 118, 126, 128 and the expansion valves 112, 122 and detect pressures anywhere between the compressors 116, 118, 126, 128 and the expansion valves 112, 122.

The evaporators 110, 120 may include, for example, micro-channel (MC) cooling coil assemblies, a MC heat exchanger, fin-and-tube cooling coil assemblies, and/or other evaporator components and assemblies. The expansion valves 112, 122 may be EEVs and/or thermostatic expansion valves. Each of the condensers 114, 124 may be of a variety of types, such as an air-cooled condenser, a water-cooled condenser, or glycol cooled condenser. The condensers 114, 124 may include heat rejection devices that transfer heat from return fluids to a cooler medium, such as outside air. The heat rejection devices may include air or liquid cooled heat exchangers.

In each of the circuits 104, 108, a cooling fluid (or refrigerant) is circulated by a respective pair of the compressors 116, 118, 126, 128. The fluids flow from the compressors 116, 118, 126, 128, through the condensers 114, 124, expansion valves 112, 122, and evaporators 110, 120 and back to the compressors 116, 118, 126, 128. The evaporators 110, 120 are arranged in stages such that air flows in a serial fashion first through the upstream evaporator 110 and then through the downstream evaporator 120. By having multiple cooling stages arranged for serial air flow, a temperature differential across the evaporators 110, 120 is reduced. This in turn allows the evaporators 110, 120 to operate at different pressure levels and allows the pressure differences between the respective evaporators 110, 120 and condensers 114, 124 to be reduced.

Since compressor electrical input power is a function of a pressure difference between an evaporator and a condenser, a lower pressure difference is more energy efficient. Each of the cooling circuits 104, 108 may include a tandem set of compressors (e.g., compressors 116, 118 or compressors 126, 128). Although the tandem set of compressors is shown as including two compressors, the tandem set of compressors may include two or more compressors. Each of the tandem compressors may be a fixed capacity scroll compressor (e.g., compressors 116, 126) or a variable capacity scroll compressor (e.g., compressors 118, 128). The variable capacity scroll compressors may be controlled via a respective digital signal received from the cooling control module 109.

Figure 3:
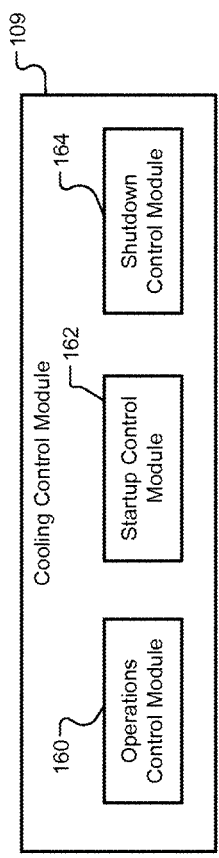
FIG. 3 is a functional block diagram of the cooling control module of FIG. 2.

Referring now also to FIG. 3, the cooling control module 109 is shown. The cooling control module 109 includes an operations control module 160, a startup control module 162, and a shutdown control module 164. The operations control module 160 generally controls operation of the cooling circuits 104, 108 during operation of the compressors 116, 118, 126, 128. The startup control module 162 generally controls operation of the cooling circuits 104, 108 during startup of the compressors 116, 118, 126, 128. The shutdown control module 164 generally controls operation of the cooling circuits 104, 108 during shutdown of the compressors 116, 118, 126, 128.

Figure 4:
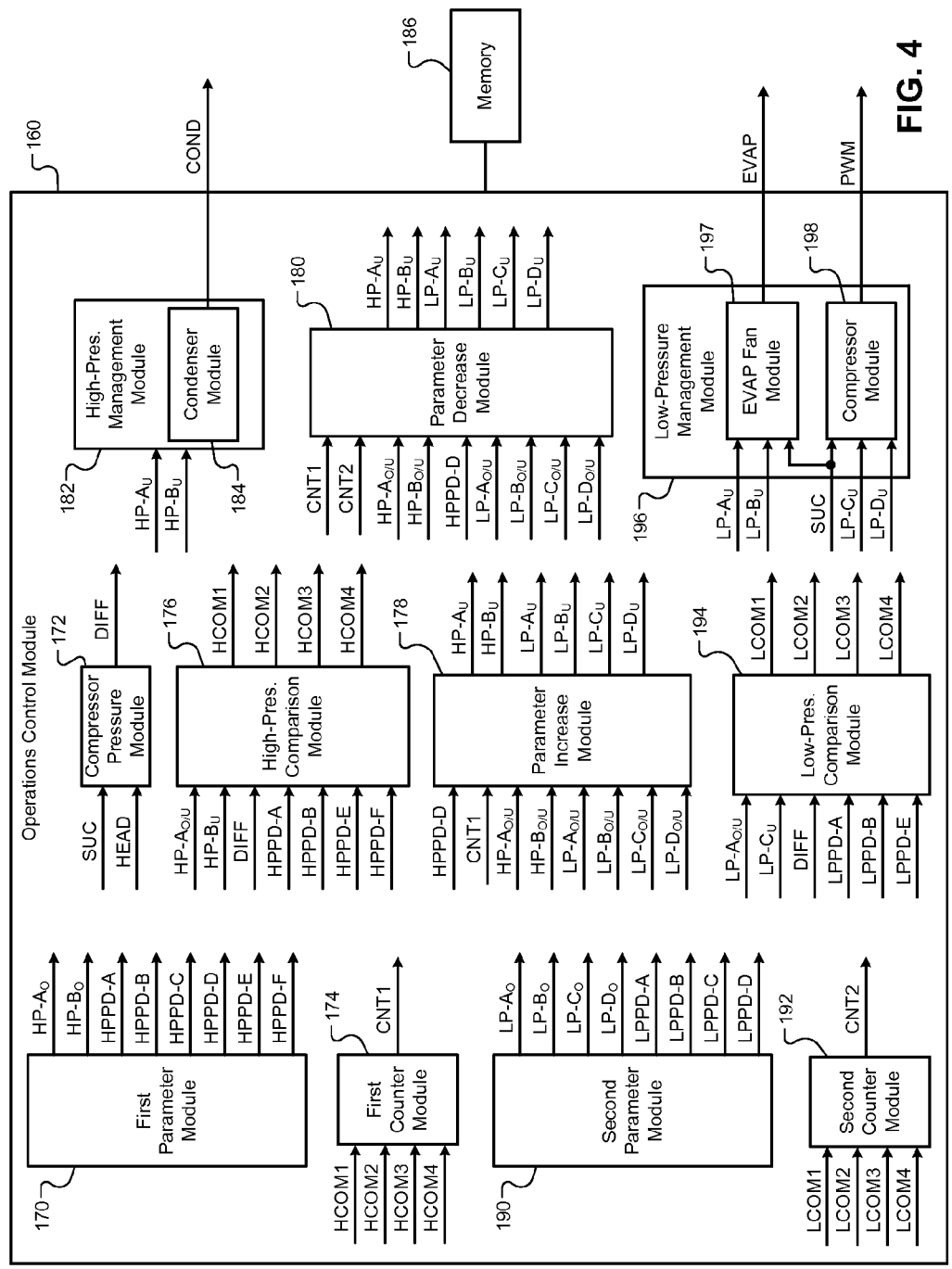
FIG. 4 is a functional block diagram of an operations control module of FIG. 3.

Referring now also to FIG. 4, the operations control module 160 is shown. The operations control module 160 performs a steady-state pressure difference (SSPD) method to control pressure differences across the compressors 116, 118, 126, 128. If a pressure difference is less than a predetermined pressure (i.e. a low-pressure difference), the operations control module 160 via the SSPD method adjusts control parameters to ensure that an appropriate level of pressure difference is maintained. The control parameters may be incrementally adjusted.

The SSPD method includes two distinct control methods; a head (high) pressure management method (referred to as SSPD-HP) illustrated in FIGS. 5A-5B, and suction (low) pressure management method (referred to as SSPD-LP) illustrated in FIGS. 7A-7B. Both the SSPD-HP and SSPD-LP methods may leverage functionality of related pre-existing control methods focusing solely on a head pressure and/or a suction pressure. Separate SSPD-HP methods may be executed for each of the cooling circuits 104, 108. Separate SSPD-LP methods may be executed for each of the cooling circuits 104, 108. For the implementation of FIG. 2, two SSPD-HP methods and two SSPD-LP methods may be executed in parallel. In other words, each of the SSPD-HP, SSPD-LP methods are executed while each of the other SSPD-HP, SSPD-LP methods are executed.

The SSPD-HP method is eligible for use by a cooling circuit having an air-cooled condenser (e.g., one of the condensers 114, 124) with variable speed fans (e.g., the condenser fans 134, 136), where the fans are controllable via a control module (e.g., the operations control module 160). The SSPD-LP method is eligible for use by a cooling circuit having a digital pulse width modulated (PWM) compressor (e.g., one of the compressors 116, 118, 126, 128) and/or a variable speed evaporator fans (e.g., the evaporator fans 130, 132).

The operations control module 160 includes a first parameter module 170, a compressor pressure module 172, a first counter module 174, a high-pressure comparison module 176, a parameter increase module 178, a parameter decrease module 180, and a high-pressure management module 182 with a condenser module 184. These modules are described with respect to the following method of FIGS. 5A-5B.

Referring now also to FIGS. 5A-5B, in which a head pressure management (or SSPD-HP) method is shown. The head pressure management method may begin at 200. The following tasks 202-224 are part of a first portion of a SSPD-HP method. Subsequent tasks 226-234 are part of a second portion of the SSPD-HP method.

At 202, the first parameter module 170 determines various parameters including a high-pressure (HP)-X series of parameters and a high-pressure pressure difference (HPPD)-X series of parameters. The HP-X series of parameters include a pressure set point value HP-A and an absolute minimum pressure value HP-B. An absolute pressure is equal to a measured pressure plus the atomic pressure or 14.7 pounds per square inch (PSI). The units-of-measure for an absolute pressure is pounds per square inch (PSIA). The HPPD-X series of parameters includes a minimum differential pressure value HPPD-A, a hysteresis value HPPD-B, an adjustment step value HPPD-C, an adjustment time value HPPD-D, a maximum set point value HPPD-E, and a maximum absolute pressure value HPPD-F. The values HP-A, HP-B may be stored in a memory 186 and accessed by the operations control module 160. These values may have original versions (denoted with a subscript O) and/or updated versions (denoted with a subscript U).

The pressure set point value HP-A is a head pressure value maintained using a proportional integral derivative (PID) method to control a condenser fan (e.g., one of the fans 134, 136). The PID method may be implemented via the condenser module 184, which generates a condenser signal COND to control the speed of the condenser fan. A PID method may use PID coefficients or gain values in a feedback algorithm to provide an output (e.g., the condenser signal COND). The absolute minimum pressure value HP-B refers to a minimum head pressure below which the operations control module 160 reduces speeds of the condenser fans to a minimum speed to prevent further reductions in head pressure.

The minimum differential value HPPD-A is a minimum amount of pressure difference, which is maintained. The parameter HPPD-A may be associated with undirected compressor unloading. Compressor unloading may occur at pressure differences less than the parameter HPPD-A and/or at pressure differences less than a result of the parameter HPPD-A minus a predetermined safety margin. The hysteresis value HPPD-B is an amount of pressure above the minimum differential value HPPD-A, which is attained to begin incrementally reversing increases made during the SSPD-HP method. The adjustment step value HPPD-C is an amount of incremental adjustment, which is applied to the parameters HP-A and HP-B when the SSPD-HP method is active.

The adjustment time value HPPD-D is an amount of time, which is permitted to lapse before the adjustment step value HPPD-C is adjusted. The maximum set point value HPPD-E is a highest allowable value, which the pressure set point value HP-A can be set to using the SSPD-HP method. The maximum absolute pressure value HPPD-F is a highest allowable value, which the absolute minimum pressure value HP-B can be set to using the SPPD-HP method.

At 204, the compressor pressure module 172 determines the suction pressure and the head pressure. The compressor pressure module 172 may receive a suction pressure signal SUC and a head pressure signal HEAD.

At 206, the compressor pressure module 172 determines a pressure difference based on the pressure signals SUC, HEAD to generate a pressure difference signal DIFF. The pressure difference signal DIFF maybe calculated by subtracting the suction pressure signal SUC from the head pressure signal HEAD.

At 208, the high-pressure comparison module 176 compares the pressure difference signal DIFF to the minimum differential value HPPD-A and generates a first high-pressure comparison signal HCOM1. If the pressure difference signal DIFF is less than the minimum differential value HPPD-A, then task 210 is performed, otherwise task 209 may be performed.

At 210, the first counter module 174 resets or increments a first counter value to generate a first count signal CNT1 based on the first high-pressure comparison signal HCOM1. The first counter value may be reset when a first iteration of tasks 208-212 is performed and incremented for subsequent iterations. At 212, the parameter increase module 178 determines whether the first count signal CNT1 is greater than the adjustment time value HPPD-D. If the first count signal CNT1 is greater than the adjustment time value HPPD-D, then task 214 is performed, otherwise task 204 may be performed.

At 209, the high-pressure comparison module 176 determines whether the pressure difference signal DIFF is greater than a sum of the values HPPD-A, HPPD-B and generates a second high-pressure comparison signal HCOM2. If the pressure difference signal DIFF is not greater than the sum, then task 211 is performed, otherwise task 226 is performed. At 211, the first counter value is reset. Task 204 is performed subsequent to task 211.

At 214, the high-pressure comparison module 176 compares the pressure set point value HP-A to the maximum set point value HPPD-E and generates a third high-pressure comparison signal HCOM3. Task 216 is performed when the pressure set point value HP-A is greater than or equal to maximum set point value HPPD-E, otherwise task 218 is performed.

At 216, the parameter increase module 178 or other module of the operations control module 160 sets the pressure set point value HP-A equal to the maximum set point value HPPD-E.

At 218, the parameter increase module 178 increases the value HP-A. The value HP-A may be incremented or increased by a predetermined amount (e.g., the amount indicated by the adjustment step value HPPD-C). The SSPD-HP method adjusts the value HP-A to alter results of a PID control method, which controls the head pressure. The PID control method may adjust speeds of the condenser fans 134, 136 to adjust the head pressure. To control characteristics of how the value HP-A are adjusted by the SSPD-HP method, the parameters HPPD-A, HPPD-B, HPPD-C, HPPD-D, HPPD-E, HPPD-F are used. The parameters HPPD-A, HPPD-B, HPPD-C, HPPD-D, HPPD-E, HPPD-F may be shared for each of the cooling circuits 104, 108 and separate SSPD-HP methods may be applied independently to each of the cooling circuits 104, 108.

At 220, the high-pressure comparison module 176 compares the absolute minimum pressure value HP-B to the maximum absolute pressure value HPPD-F and generates a fourth high-pressure comparison signal HCOM4. If the absolute minimum pressure value HP-B is greater than or equal to the maximum absolute pressure value HPPD-F, then task 222 is performed, otherwise task 224 is performed.

At 222, the parameter increase module 178 or other module of the operations control module 160 sets the absolute minimum pressure value HP-B equal to the maximum absolute pressure value HPPD-F.

At 224, the parameter increase module 178 increases or increments the absolute minimum pressure value HP-B. The absolute minimum pressure value HP-B may be incremented or increased by a predetermined amount (e.g., the amount indicated by the adjustment step value HPPD-C). The SSPD-HP method adjusts the value HP-B to alter results of a PID control method, which controls the head pressure. The PID control method may adjust speeds of the condenser fans 134, 136 to adjust the head pressure. To control characteristics of how the value HP-B are adjusted by the SSPD-HP method, the parameters HPPD-A, HPPD-B, HPPD-C, HPPD-D, HPPD-E, HPPD-F are used. The parameters HPPD-A, HPPD-B, HPPD-C, HPPD-D, HPPD-E, HPPD-F may be shared for each of the cooling circuits 104, 108 and separate SSPD-HP methods may be applied independently to each of the cooling circuits 104, 108.

At 226, the first counter value or the first count signal CNT1 is reset or incremented based on the first high-pressure comparison signal HCOM1. At 228, the parameter decrease module 180 determines whether the first count signal CNT1 is greater than the adjustment time value HPPD-D. Task 230 is performed when the first count signal CNT1 is greater than the adjustment time value HPPD-D, otherwise task 204 is performed.

At 230, the parameter decrease module 180 may determine whether the values HP-A, HP-B (or updated values HP-$A_U$, HP-$B_U$) are less than or equal to their original values HP-$A_O$, HP-$B_O$ based on the first high-pressure comparison signal HCOM1. If the values HP-A, HP-B are less than or equal to their original values, then task 232 is performed, otherwise task 234 is performed.

At 232, the parameter decrease module 180 or other module of the operations control module 160 sets the values HP-A, HP-B to their original values HP-$A_O$, HP-$B_O$. At 234, the parameter decrease module 180 decreases or decrements the values HP-A, HP-B based on the second high-pressure comparison signal HCOM2. The parameter decrease module 180 may decrease each of the values HP-A, HP-B by a predetermined amount (e.g., the amount indicated by the adjustment step value HPPD-C). Task 204 may be performed subsequent to tasks 232 and 234.

Referring now to FIG. 6, a pressure difference plot associated with the head pressure management of FIGS. 5A and 5B is shown. FIG. 6 illustrates incremental increases and decreases in the values HP-A, HP-B and corresponding changes in the pressure difference signal DIFF. FIG. 6 includes line segments for the parameter HPPD-A and the sum of the parameters HPPD-A, HPPD-B.

As shown in FIG. 6, when the pressure difference signal DIFF decreases below the minimum differential value HPPD-A for an amount of time defined by the parameter HPPD-D, the values HP-A, HP-B are incremented, which increases the pressure difference signal DIFF. This causes speeds of the condenser fans 134, 136 to be reduced, which results in an increase in head pressure. The increased head pressure results in an increase in the pressure difference signal DIFF. The values HP-A, HP-B are decremented when the pressure difference signal DIFF is greater than the sum of HPPD-A, HPPD-B for an amount of time defined by the parameter HPPD-D.

Referring again to FIG. 4, the operations control module 160 may further include a second parameter module 190, a second counter module 192, a low-pressure comparison module 194, and a low-pressure management module 196 with an evaporator fan module 197 and a compressor module 198. These modules are described with respect to the following suction pressure management method of FIGS. 7A-7B. The suction pressure management (or SSPD-LP) method may begin at 250.

At 252, the second parameter module 190 determines various parameters including a low-pressure (LP)-X series of parameters and a low-pressure pressure difference (LPPD)-X series of parameters. The LP-X series of parameters include an evaporator fan decrease value LP-A, an evaporator fan minimum value LP-B, a compressor increase value LP-C, a compressor maximum value LP-D. The values LP-A, LP-B, LP-C, LP-D may be stored in the memory 186 and accessed by the operations control module 160. These values may have original versions (denoted with a subscript O) and/or updated versions (denoted with a subscript U).

The evaporator fan decrease value LP-A is a suction pressure at which and/or above which speed of an evaporator fan is decreased to reduce evaporator pressure. The evaporator fan minimum value LP-B refers to suction pressure at which or above which the speed of the evaporator fan is set to a minimum speed to reduce evaporator pressure. The compressor increase value LP-C is a suction pressure at which or above which the operations control module increases a pulse width modulated (PWM) duty cycle percentage (referred to hereinafter as PWM %) of a variable capacity compressor to reduce evaporator pressure. The compressor maximum value LP-D is a suction pressure at which or above which the operations control module operates the variable capacity compressor at a maximum PWM % to reduce evaporator pressure.

The SSPD-LP method adjusts a high-suction pressure management (HSPM) method by adjusting the LP-X series of parameters. The HSPM method is used to decrease speeds of an evaporator fan and increase a variable compressor PWM % to reduce high evaporator pressures. The evaporator fan module 197 may generate an evaporator fan signal EVAP to adjust the speed of the evaporator fan based on the values LP-A, LP-B. The compressor module 198 may generate a compressor signal PWM to control the variable compressor PWM % based on the suction pressure signal SUC and the values LP-C, LP-D.

Referring also to FIG. 8, an evaporator fan speed and compressor duty cycle plot associated with the HSPM method is shown. The plot of FIG. 8 illustrates how adjustments in the LP-X series of parameters alters the speed of the evaporator fan and the variable compressor PWM % to reduce the suction pressure signal SUC and/or prevent the suction pressure signal SUC from exceeding a predetermined threshold.

If the suction pressure signal SUC is less than the evaporator fan decrease value LP-A, then the speed of the evaporator fan is not altered based on the HSPM method. The speed of the evaporator fan may be maintained at a current speed via the evaporator fan module 197. If the suction pressure signal SUC is between the values LP-A and LP-B, then the evaporator fan module 197 reduces the speed of the evaporator fan to a speed, which is determined by linearly interpolating between X and Y axis positions associated with the values LP-A and LP-B. An interpolated segment 199 is shown between values LP-A, LP-B in FIG. 8. If the suction pressure signal is greater than the evaporator fan minimum value LP-B, the evaporator fan module 197 adjusts the speed of the evaporator fan to a minimum evaporator fan speed. This decreases the fan speed as illustrated by the interpolated segment.

If the suction pressure signal SUC is less than the compressor increase value LP-C, then the compressor module 198 does not adjust the variable compressor PWM % during the HSPM method. The variable compressor PWM % may be maintained at a current PWM %. If the suction pressure signal SUC is between the values LP-C, LP-D, then the compressor module increases the variable compressor PWM % to a level, which is determined by linearly interpolating between X and Y axis positions of the values LP-C, LP-D. An interpolated segment 200 is shown between values LP-C, LP-D. If the suction pressure is greater than compressor maximum value LP-D, the compressor module 198 operates the variable compressor at a maximum compressor PWM %.

The SSPD-LP method uses the LPPD-X series of parameters to influence HSPM operation for the purpose of ensuring that a minimum compressor pressure difference is maintained. Although the LPPD-X series of parameters may be shared between the cooling circuits 104, 108 of FIG. 2, SSPD-LP methods may be independently executed for each of the cooling circuits 104, 108. The LPPD-X series of parameters includes a minimum differential pressure value LPPD-A, a hysteresis value LPPD-B, an adjustment step value LPPD-C, an adjustment time value LPPD-D, and a minimum set point value LPPD-E.

The minimum differential pressure value LPPD-A is a minimum amount of pressure difference, which is maintained. The parameter LPPD-A may be associated with compressor unloading. Compressor unloading may occur at pressure differences less than LPPD-A and/or less than LPPD-A minus a predetermined safety margin. If the pressure difference drops below the value LPPD-A, a SSPD-LP method is activated, as illustrated by tasks 252-278. The hysteresis value LPPD-B is an amount of pressure above the minimum differential pressure value LPPD-A, which is attained to begin incrementally reversing the decreases made during the SSPD-LP method.

The adjustment step value LPPD-C is an amount of incremental adjustment, which is applied to the values LP-A, LP-B, LP-C, LP-D when the SSPD-LP method is active. The adjustment time value LPPD-D is an amount of time, which lapses before another LPPD-C incremental adjustment can be applied. The minimum set point value LPPD-E is a lowest allowable value, which the values LP-A, LP-C can be set to during the SSPD-LP method.

Referring again to FIGS. 7A-7B, at 254, the compressor pressure module 172 determines the suction pressure and the head pressure. At 256, the compressor pressure module 172 determines a pressure difference based on the pressure signals SUC, HEAD to generate a pressure difference signal DIFF.

At 258, the low-pressure comparison module 194 compares the pressure difference signal DIFF to the minimum differential value LPPD-A and generates a first low-pressure comparison signal LCOM1. If the pressure difference signal DIFF is less than the minimum differential value LPPD-A, then task 260 is performed, otherwise task 259 may be performed.

At 260, the second counter module 192 resets or increments a second counter value to generate a second count signal CNT2 based on the first low-pressure comparison signal LCOM1. The second counter value may be reset when a first iteration of tasks 258-262 is performed and incremented for subsequent iterations.

At 259, the low-pressure comparison module 194 determines whether the pressure difference signal DIFF is greater than a sum of the values LPPD-A, LPPD-B and generates a second low-pressure comparison signal LCOM2. If the pressure difference signal DIFF is not greater than the sum, then task 270 is performed, otherwise task 261 is performed. At 261, the second counter value is reset. Task 254 is performed subsequent to task 261.

At 262, the parameter decrease module 180 determines whether the second count signal CNT2 is greater than the adjustment time value LPPD-D. If the second count signal CNT2 is greater than the adjustment time value LPPD-D, then task 264 is performed, otherwise task 254 may be performed.

At 264, the low-pressure comparison module 194 compares the pressure set point value LP-A to the minimum set point value LPPD-E and generates a third low-pressure comparison signal LCOM3. Task 254 is performed when the pressure set point value HP-A is less than or equal to minimum set point value LPPD-E, otherwise task 266 is performed.

At 266, the low-pressure comparison module 194 compares the compressor increase value LP-C to the minimum absolute pressure value LPPD-E. If the compressor increase value LP-C is less than or equal to the minimum absolute pressure value LPPD-E, then task 254 is performed, otherwise task 268 is performed.

At 268, the parameter decrease module 180 decreases the values LP-A, LP-B, LP-C, LP-D. The values LP-A, LP-B, LP-C, LP-D may be decremented or decreased by a predetermined amount (e.g., the amount indicated by the adjustment step value LPPD-C).

At 270, the second counter module 192 resets or increments the second count signal CNT2. At 272, the parameter decrease module 180 determines whether the second count signal CNT2 is greater than the adjustment time value LPPD-D. Task 274 is performed when the second count signal CNT2 is greater than the adjustment time value LPPD-D, otherwise task 254 is performed.

At 274, the parameter decrease module 180 may determine whether the values LP-A, LP-B, LP-C, LP-D (or updated values LP-A$_U$, LP-B$_U$, LP-C$_U$, LP-D$_U$) are greater than or equal to their original values LP-A$_O$, LP-B$_O$, LP-C$_O$, LP-D$_O$ based on the first low-pressure comparison signal LCOM1. If the values LP-A, LP-B, LP-C, LP-D are greater than or equal to their original values, task 276 is performed, otherwise task 278 may be performed.

At 276, the parameter increase module 178 set the values LP-A, LP-B, LP-C, LP-D to their original values LP-A$_O$, LP-B$_O$, LP-C$_O$, LP-D$_O$.

At 278, the parameter increase module 178 increases or increments the values LP-A, LP-B, LP-C, LP-D. The parameter increase module 178 may increase each of the values LP-A, LP-B, LP-C, LP-D by a predetermined amount (e.g., the amount indicated by the adjustment step value LPPD-C). Task 254 may be performed subsequent to tasks 276 and 278.

In FIGS. 9-10, compressor plot and a pressure difference plot are shown. The compressor plot illustrates PWM percentages versus suction pressures provided during the method of FIGS. 7A-7B. The pressure difference plot illustrates compressor pressure differences during the method of FIGS. 7A-7B. When the pressure difference signal DIFF decreases to a value less than the value LPPD-A for the period defined by LPPD-D, the HSPM parameters or LP-A, LP-B, LP-C, LP-D are adjusted to increase the variable compressor PWM %. The suction pressures to initiate the HSPM method are incrementally reduced by the SSPD-LP method when the pressure difference signal DIFF is less than the value LPPD-A. This causes the speed of the evaporator fan to be reduced and the variable compressor PWM % to be increased. These actions also cause a pressure of the evaporator to decrease, which results in an overall higher pressure difference.

The methods of FIGS. 5A, 5B, 7A, 7B may both be performed to ensure that an overall pressure difference(s) for compressor(s) are maintained above a predetermined level to prevent undirected unloading of the compressor(s). The predetermine level may be a manufacturer determined level. The methods may be used to prevent unloading in, for example, air conditioning systems with scroll compressors, which operate with high-evaporating pressures and low-condensing pressures. An example of combining these methods is provided by the method of FIG. 11.

Referring now also to FIG. 11, a logic flow diagram illustrating a dual-pressure management method is shown and illustrates SSPD-HP and SSPD-LP interaction. To prevent instances of system instability resulting from too many concurrent pressure-related adjustments, the operations control module 160 may implement an interlock function. The interlock function ensures that the actions of the SSPD-HP method are sequenced appropriately with the actions of the SSPD-LP method. The dual-pressure management method may begin at 300.

At 301, a compressor pressure difference is determined. At 302, the high-pressure comparison module 176 determines whether the pressure difference is less than the minimum differential value HPPD-A. Task 304 is performed when the pressure difference is less than the minimum differential value HPPD-A, otherwise task 308 may be performed.

At 304, the operations control module 160 starts the increase routine of the SSPD-HP method of FIG. 5A. Task 210 may be performed subsequent to task 304. The operations control module 160 may return to task 308 after performing task 224.

At 308, the low-pressure comparison module 194 determines whether the pressure difference signal DIFF is less than the minimum differential value LPPD-A. Task 310 is performed when the pressure difference signal DIFF is less than the minimum differential value LPPD-A, otherwise task 312 may be performed.

At 310, the operations control module 160 starts the decrease routine of the SSPD-LP method. Task 260 may be performed subsequent to task 310. The operations control module 160 may return to task 301 after performing task 268.

At 312, the low-pressure comparison module 194 determines whether the pressure difference signal DIFF is greater than a sum of the values LPPD-A and LPPD-B. Task 314 is performed when the pressure difference signal DIFF is greater than the sum of the values LPPD-A and LPPD-B, otherwise task 316 is performed.

At 314, the operations control module 160 starts the decrease routine of the SSPD-HP method. Task 226 may be performed subsequent to task 314. The operations control module 160 may return to task 316 after performing task 232 and/or 234.

At 316, the low-pressure comparison module 194 determines whether the pressure difference signal DIFF is greater than a sum of the values LPPD-A and LPPD-B. Task 318 is performed when the pressure difference signal DIFF is greater than the sum, otherwise task 301 is performed. At 318, the parameter increase module 178 may set or increase the HSPM parameters and/or the values LP-A, LP-B, LP-C, LP-D by performing the increase routine of the SSPD-LP method at task 270. The HSPM parameters and/or the values LP-A, LP-B, LP-C, LP-D may be increased to reverse previously performed reductions. The operations control module 160 may return to task 301 after performing task 276 and/or 278.

If one of the methods SSPD-HP or SSPD-LP are disabled (or not active), the other one of the methods may be enabled (or active) without dependence on the disabled method.

As an example, the methods of FIGS. 5A, 5B, 7A, 7B, and 11 may be used to monitor and regulate compressor pressure difference(s) for an air conditioning system with tandem digital scroll compressor(s), condenser(s), and EEVs. As another example, the methods of FIGS. 5A, 5B, 7A, 7B, and 11 may be used to monitor and regulate compressor pressure difference(s) for an air conditioning system with fixed, digital, or tandem scroll compressor(s), a water-cooled condenser(s), and EEVs or thermostatic expansion valve(s).

The methods of FIGS. 5A, 5B, 7A, 7B, and 11 prevent undirected unloading of compressors. As the methods are performed via the cooling control module 109, the cooling system 100 and methods can be monitored, configured, enabled, and/or disabled via a user interface 329. The user interface 329 may include a keypad, a keyboard, a mouse, a touch screen, or other suitable user interface.

In FIG. 12, the startup control module 162 is shown. The startup control module 162 includes a temperature error module 330, a startup cooling module 332, a first startup comparison module 334, a delay timer 336, a temperature module 338, a second startup comparison module 340, a third startup comparison module 342, a lead compressor module 344, a lag compressor module 345, and a lag timer 349. The parameters used and/or generated by the modules of the startup control module 162 may be stored in the memory 186. Operation of these modules is described with respect to the method of FIG. 13.

Referring also to FIG. 13, a lag compressor based startup pressure difference (SUPD) method is shown. The SUPD method may be performed for each of the cooling circuits 104, 108 of FIG. 2. Each of the SUPD methods includes two control methods. Each of the control methods includes operations independent of the other control method. The first control method includes starting both a lead compressor and a lag compressor in a tandem set. The first control method may be referred to as the SUPD-lag compressor (LC) method.

The lead compressor is the compressor, which starts first. The lag compressor has an activation point which is higher than the activation point of the lead compressor. Thus, startup of the lag compressor generally occurs after the startup of the lead compressor. The lead compressor may start before the lag compressor, for example, when the SUPD-LC method is inactive. By default, a digital variable capacity scroll compressor may be the lead compressor and a fixed capacity scroll compressor may be the lag compressor. Both of the lead and lag compressors are started when cooling for a current operating condition can be satisfied by a cooling capacity of one of the lead and lag compressors.

The second control method includes operating a condenser fan at a speed less than a previous or predetermined speed when the lead and lag compressors start. The second control method is referred to as the SUPD-condenser fan (CF) method. The SUPD-LC method is available for an air conditioning system that has tandem variable capacity scroll compressors and an outdoor ambient temperature sensor input (or a suction pressure input). The SUPD-CF method is available for air conditioning systems, which have an outdoor ambient temperature sensor input and an air-cooled condenser. The air-cooled condenser has a condenser fan speed that can be controlled by a control module and the control module activates the tandem variable capacity scroll compressors. The tandem variable capacity scroll compressors are activated based on a call for cooling value CFC for both of the SUPD-LC and SUPD-CF methods. The call for cooling value CFC is used primarily to activate and deactivate compressors.

The SUPD-LC method includes activating the lag compressor after the lead compressor, when a low-pressure difference across a compressor is detected. This allows the tandem set to operate at a full rate of volumetric displacement to more rapidly increase the pressure difference. The following parameters LCPD-A, LCPD-B, LCPD-C, LCPD-D, LCPD-E, LCPD-F, LCPD-X are used during the SUPD-LC method. The parameter LCPD-A is an outdoor ambient temperature associated with activating the lag compressor. The SUPD-LC method is started when the LCPD-A temperature is reached.

The parameter LCPD-B refers to a lead compressor activation point. When the call for cooling value CFC is greater than the parameter LCPD-B, the lead compressor is activated. The parameter LCPD-C refers to a lead compressor deactivation point. When the call for cooling value CFC is less than the parameter LCPD-C, the lead compressor is deactivated. The parameter LCPD-D refers to a lag compressor activation point. When the call for cooling value CFC is greater than the parameter LCPD-D, the lag compressor is activated. The parameter LCPD-E refers to a lag compressor deactivation point. When the call for cooling value CFC is less than the parameter LCPD-E, the lag compressor is deactivated.

The parameter LCPD-F refers to a compressor minimum ON time. This is an amount of time that each of the compressors is maintained in an ON or active state once the compressor is started before deactivation of the compressor. The parameter LCPD-X refers to a suction pressure above which the lag compressor is activated. The SUPD-LC method may be started when the suction pressure is greater than the parameter LCPD-X. The suction pressure may be used to activate the SUPD-LC method and/or to activate the lag compressor when an outdoor ambient temperature reading is unavailable.

The lag compressor based SUPD method may begin at 350. At 352, the temperature error module 330 determines a control temperature error value CFE based on the ambient temperature $T_A$ and a predetermined temperature setpoint SET. The control temperature error value CFE may be equal to the ambient temperature $T_A$ minus the predetermined temperature setpoint SET.

At 354, the startup cooling module 332 determines the call for cooling value CFC based on or as a function of the control temperature error value CFE. At 356, the first startup comparison module 334 compares the call for cooling value CFC with the parameter LCPD-B to generate a first CFC comparison signal $SCOM1_B$. If the call for cooling value CFC is greater than the parameter LCPD-B, then task 358 is performed, otherwise task 352 is performed.

At 358, the lead compressor module 344 generates a lead compressor signal PWM based on the first comparison signal SCOM1. The lead compressor is started first in response to the call for cooling value CFC rising above a corresponding activation point.

At 360, the delay timer starts a first timer and generates a first delay timer signal TIM1. At 361, the first startup comparison module 334 compares the call for cooling value CFC with the parameter LCPD-D to generate a second CFC comparison signal $SCOM1_D$. If the call for cooling value CFC is greater than the parameter LCPD-D, then task 370 is performed, otherwise task 362 is performed.

At 362, the temperature module 338 determined the outdoor ambient temperature $T_A$ and/or the second startup comparison module 340 determines the suction pressure, which may be based on the suction pressure signal SUC. At 364, the temperature module 338 compares the outdoor ambient temperature $T_A$ with the parameter LCPD-A to generate a second comparison signal SCOM2. The second startup comparison module 340 may alternatively or in addition compare the suction pressure signal SUC with the parameter LCPD-X to generate a third comparison signal SCOM3. When the outdoor ambient temperature $T_A$ is less than the parameter LCPD-A and/or the suction pressure signal SUC is less than the parameter LCPD-X, task 366 is performed, otherwise task 368 is performed.

If the startup control module 162 loses communication with the outdoor ambient temperature sensor 150 or the cooling system 100 is not equipped with an outdoor ambient temperature sensor, then the SUPD-LC method can be activated based on the suction pressure signal SUC. The activation may occur when the suction pressure signal SUC is less than the parameter LCPD-X and when the lead compressor is activated.

At 366, the lag compressor module 345 starts the SUPD-LC method based on the second and third comparison signals SCOM2, SCOM3. Task 370 is performed subsequent to task 366.

At 368, the lag compressor module 345 determines whether the first timer signal TIM1 is greater than a predetermine amount of time (e.g., 10 seconds). If the result of task 368 is TRUE, the method ends at 369.

At 370, the lag compressor module 345 starts the lag (fixed) compressor. At 371, the lag timer 349 is started when the lag compressor is activated to record an amount of time that the lag compressor is ON based on the second and third comparison signals SCOM2, SCOM3. The ON time of the lag compressor is indicated via a lag time signal TIMLAG.

At 372, the lag compressor module 345 determines whether an alarm signal ALARM has been generated for the lag compressor. The alarm signal ALARM may be generated, for example, when there is fault associated with the operation of the lag compressor. Task 375 is performed when the result of task 372 is TRUE, otherwise task 374 is performed. At 374, the lag compressor module 345 determines whether the lead compressor has been turned OFF based on the PWM signal. Task 375 is performed when the lead compressor has been turned off, otherwise task 376 is performed. At 375, the lag compressor module 345 turns off the lag compressor. The lead compressor may also be turned off, if the lead compressor is not already turned off.

At 376, the lag compressor module 345 determines whether the lag time signal TIMLAG is greater than the parameter LCPD-F. If the result of task 376 is TRUE, task 368 is performed, otherwise task 372 is performed.

In FIG. 14, a compressor status and cooling value plot associated with the lag compressor based startup pressure difference method of FIG. 13 is shown. FIG. 14 includes the outdoor ambient temperature signal $T_A$, a call for cooling value signal CFC, and lead and lag compressor motor status signals. The lead and lag compressor motor status signals indicate when the lead and lag compressors are activated and deactivated. The parameters LCPD-A, LCPD-B, LCPD-C, LCPD-D, LCPD-E are also shown as respective lines. FIG. 14 illustrates the lag compressor being activated shortly after the lead compressor is activated, although the call for cooling value signal CFC is not greater than the activation threshold identified by the parameter LCPD-D. The lag compressor is turned OFF when the call for cooling value signal CFC decreases to a value less than the deactivation setpoint (identified by the parameter LCPD-E) and the minimum ON time (identified by the parameter LCPD-F) has lapsed.

Referring again to FIG. 12, the startup control module 162 may further include a condenser fan module 346. The condenser fan module 346 may include a first fan control module 347 and a second fan control module 348.

The condenser fan module 346 may execute a first startup pressure difference method when non-tandem compressors are used and a second startup pressure difference method when tandem compressors are used. The methods may be executed based on the outdoor ambient temperature $T_A$, a parameter CFPD-A, parameters CFPD-TX, parameters CFPD-CAX, and parameters CFPD-CBX.

The parameter CFPD-A refers to a SUPD-CF active time and defines an amount of time in which the SUPD-CF method is to be active after the compressor or tandem set is started. The parameters CFPD-TX refers to parameters CFPD-T1 through CFPD-T8, which are outdoor air temperatures associated with condenser fan speeds indicated by the parameters CFPD-CAX and CFPD-CBX.

The parameters CFPD-CAX refers to parameters CFPD-CA1 through CFPD-CA8, which are condenser fan speeds. The condenser fan speeds may be used at each of the corresponding CFPD-TX temperatures when non-tandem compressors are used. The parameters CFPD-CAX may also be used for a lead compressor in a tandem set.

The parameters CFPD-CBX refer to parameters CFPD-CB1 through CFPD-CB8, which are condenser fan speeds. The condenser fan speeds may be used at each of the corresponding CFPD-TX temperatures when the lag compressor in a tandem set is started before the timer associated with the parameter CFPD-A lapses. The parameters CFPD-CBX may be used with tandem scroll compressors. For air conditioning systems with multiple cooling circuits, separate sets of parameters CFPD-CAX and CFPD-CBX are provided for each individual cooling circuit.

Table 1 provides an example of parameters CFPD-TX, CFPD-CAX, and CFPD-CBX stored in tabular form.

TABLE 1

| SUPD-CF Temperature and Fan Speed Parameters | | |
|---|---|---|
| CFPD-T8 (Highest Temperature) | CFPD-CA8 | CFPD-CB8 |
| CFPD-T7 | CFPD-CA7 | CFPD-CB7 |
| CFPD-T6 | CFPD-CA6 | CFPD-CB6 |
| CFPD-T5 | CFPD-CA5 | CFPD-CB5 |
| CFPD-T4 | CFPD-CA4 | CFPD-CB4 |
| CFPD-T3 | CFPD-CA3 | CFPD-CB3 |
| CFPD-T2 | CFPD-CA2 | CFPD-CB2 |
| CFPD-T1 (Lowest Temperature) | CFPD-CA1 | CFPD-CB1 |

Referring also to FIG. 15, a condenser fan based startup pressure difference method for use with each set of non-tandem compressors is shown. The method may begin at 400.

At 402, the first fan control module 347 controls speeds of the condenser fans according to a condenser fan proportional integral derivative (CFPID) method. The CFPID method is performed to maintain a desired head pressure.

The CFPID method is used to generate a condenser fan control signal CF, which controls the speeds of the condenser fans.

At 404, the condenser fan module 346 determines whether a compressor (e.g., the lead compressor and/or the lag compressor) has started based on the lead compressor signal PWM and the lag compressor signal LAG. At 406, the condenser fan module 346 or the second fan control module 348 starts the SUPD-CF method and temporarily overrides the CFPID method when one of the compressors has started. By doing this, the condenser fans are maintained at a reduced speed (e.g., a speed slower than when the CFPID method was active). The reduced condenser fan speed facilitates rapid generation and increase in the head pressure, which contributes to a rapid establishment and increase in the pressure difference during compressor startup.

At 408, the delay timer 336 starts a second timer and generates a second timer signal TIM2 based on the first comparison signal SCOM1, the lead compressor signal PWM, and/or the lag compressor signal LAG. At 410, the condenser fan module 346 and/or the second fan control module 348 maintains the speeds of the condenser fans based on the outdoor ambient temperature $T_A$ and parameters CFPD-TX and CFPD-CAX. The condenser fan module 346 and/or the second fan control module 348 may interpolate between CFPD-TX and CFPD-CAX points to determine condenser fan speeds based on the outdoor ambient temperature $T_A$.

As Table 1 shows, each CFPD-CAX fan speed parameter is paired with its corresponding CFPD-TX temperature. These pairings are then used to interpolate the condenser fan speed to be used when the SUPD-CF method is active, as shown in FIG. 17. FIG. 17 shows the condenser fan speeds that may be used for the SUPD-CF method. The condenser fan speeds may be determined by linear interpolation between the appropriate CFPD-CAX and CFPD-TX points.

At 412, the condenser fan module 346 may determine whether the second timer signal TIM2 has exceeded a predetermined time or the time indicated by the parameter CFPD-A. Task 414 is performed when the result of task 412 is TRUE, otherwise task 410 may be performed to update the condenser fan speed and the parameters $T_A$, CFPD-TX, CFPD-CAX.

At 414, the condenser fan module 346 returns to controlling and/or ramping speeds of the condenser fans according to the CFPID method. The SUPD-CF method is deactivated. The second fan control module 348 relinquishes control of the condenser fans to the first fan control module 347. The method may end after task 414 at 416.

In FIG. 16, a condenser fan based startup pressure difference method for use with each set of tandem compressors is shown. The method may begin at 450.

At 452, the first fan control module 347 controls speeds of the condenser fans according to the CFPID method. The CFPID method is performed to maintain a selected or predetermined head pressure. The CFPID method is used to generate the condenser fan control signal CF, which controls the speeds of the condenser fans.

At 454, the condenser fan module 346 determines whether the lead compressor has started based on the lead compressor signal PWM. At 406, the condenser fan module 346 or the second fan control module 348 starts the SUPD-CF method and temporarily overrides the CFPID method when one of the compressors has started. By doing this, the condenser fans are maintained at a reduced speed (e.g., a speed slower than when the CFPID method was active). The reduced condenser fan speed facilitates rapid generation and increase in the head pressure, which contributes to a rapid establishment and increase in the pressure difference during compressor startup.

At 458, the delay timer 336 starts the second timer and generates the second timer signal TIM2. At 460, the condenser fan module 346 and/or the second fan control module 348 maintains the speeds of the condenser fans based on the outdoor ambient temperature $T_A$ and parameters CFPD-TX and CFPD-CAX. The condenser fan module 346 and/or the second fan control module 348 may interpolate between CFPD-TX and CFPD-CAX points to determine condenser fan speeds based on the outdoor ambient temperature $T_A$.

As Table 1 shows, each CFPD-CAX fan speed parameter is paired with its corresponding CFPD-TX temperature. These pairings are then used to interpolate the condenser fan speed to be used when the SUPD-CF method is active, as shown in FIG. 17. FIG. 17 shows the condenser fan speeds that may be used for the SUPD-CF method. The condenser fan speeds may be determined by linear interpolation between the appropriate CFPD-CAX and CFPD-TX points.

At 462, the condenser fan module 346 may determine whether the second timer signal TIM2 has exceeded a predetermined time or the time indicated by the parameter CFPD-A. Task 464 is performed when the result of task 462 is FALSE. Task 468 is performed when the result of task 462 is TRUE. At 464, the second fan control module 348 determines whether the lag compressor has started based on the lag compressor signal LAG. If the lag compressor has started task 466 is performed, otherwise task 460 may be performed to update the condenser fan speed and the parameters $T_A$, CFPD-TX, CFPD-CAX.

At 466, the condenser fan module 346 and/or the second fan control module 348 maintains the speeds of the condenser fans based on the outdoor ambient temperature $T_A$ and parameters CFPD-TX and CFPD-CBX. The condenser fan module 346 and/or the second fan control module 348 may interpolate between CFPD-TX and CFPD-CBX points to determine condenser fan speeds based on the outdoor ambient temperature $T_A$.

As Table 1 shows, each CFPD-CBX fan speed parameter is paired with its corresponding CFPD-TX temperature. These pairings are then used to interpolate the condenser fan speeds. The condenser fan speeds may be determined by linear interpolation between the appropriate CFPD-CBX and CFPD-TX points.

At 467, the condenser fan module 346 may determine whether the second timer signal TIM2 has exceeded a predetermined time or the time indicated by the parameter CFPD-A. Task 468 is performed when the result of task 467 is TRUE, otherwise task 466 may be performed to update the condenser fan speed and the parameters $T_A$, CFPD-TX, CFPD-CBX.

At 468, the condenser fan module 346 returns to controlling and/or ramping speeds of the condenser fans according to the CFPID method. The SUPD-CF method is deactivated. The second fan control module 348 relinquishes control of the condenser fans to the first fan control module 347. The method may end after task 468 at 470.

In FIG. 18, a condenser fan speed plot for operation with tandem compressors is shown. FIG. 18 shows an example of SUPD-CF operation for tandem compressors with the SUPD-LC method disabled (i.e. not being used when the SUPD-CF method is being used).

The SUPD-CF method holds the condenser fan at a reduced speed during startup of the lead compressor, which causes the head pressure to rise above the condenser pressure set point indicated by the rising CF signal. When the lag compressor is activated, the condenser fan speed is increased to avoid allowing the head pressure to climb high enough to actuate a high-pressure discharge switch which may reside in a high-pressure discharge line. The high-pressure discharge line may be connected to, for example, a line 480 extending between the condenser 114 and the evaporator 110 or a line 482 extending between the condenser 124 and the evaporator 120 of FIG. 2. The parameter CFPD-A may be set to, for example, 5 minutes. As a result, the second timer may expire at the 5 minute interval. Subsequent to the second timer expiring, the speed of the condenser fan may be ramped towards the speed provided by the CFPID method.

The methods of FIGS. 13, 15, and 16 may be used to manipulate compressor and condenser fan operation to provide a cooling capacity and/or output intensity that is inversely proportionate to changes in an outdoor ambient temperature. The cooling capacity is provided quickly. This provides temperature stability and compressor reliability during compressor startup operation to prevent undirected unloading of compressors.

The parameters of the methods of FIGS. 13, 15, and 16 are configurable via the user interface 329 of FIG. 2. The methods manipulate compressor and condenser fan operation based on an outdoor ambient temperature. This control proactively prevents low-compressor pressure differences during compressor startup and minimizes undirected compressor unloading associated with operating a tandem set of compressors in an unloaded condition during compressor startup.

The methods of FIGS. 13, 15, and 16 may be applied to, for example, an air conditioning system with tandem digital scroll compressors, a condenser, and an EEV. As another example, the methods may be applied to an air conditioning system with fixed, digital, or tandem digital scroll compressors, a water-cooled condenser, and an EEV or thermostatic expansion valve.

In FIG. 19, the shutdown control module is shown. The shutdown control module 164 may include the lag compressor module 345, a load duration timer 484, an overwrite timer 485, a routine module 486, a lead compressor module 487, an expansion valve module 488, a shutdown parameter module 489, and a condenser fan module 346. The parameters used and/or generated by the modules of the shutdown control module 164 may be stored in the memory 186. The operations of the modules are described with respect to the method of FIG. 20.

In FIG. 20, a compressor transition pressure difference (CTPD) method is shown. The CTPD method may be used for each tandem set of lead and lag compressors. The CTPD method includes a digital scroll (DS) method, an electronic expansion valve (EEV) motor overload protection (MOP) control method, and a condenser fan reduction (FR) method, referred to respectively as the CTPD-DS, CTPD-EV, and CTPD-FR methods.

The CTPD-DS, CTPD-EV, and CTPD-FR methods are activated when a lag compressor is being deactivated to satisfy the call for cooling value CFC. The call for cooling value CFC may be used to modulate a compressor capacity, turn compressors ON and OFF, and to determine a digital scroll compressor PWM %. For the CTPD method, the relationship between the call for cooling value CFC and the digital scroll compressor PWM % may be used to obtain a PWMCFC signal. The PWMCFC signal is the digital scroll compressor PWM % determined based on the call for cooling value CFC. The PWMCFC signal is a function of both the call for cooling value CFC and a number of compressors which are ON. This dependence on the number of active compressors accounts for a discontinuity in the PWMCFC signal when the lag compressor is deactivated, which is shown by segment 490 in the plot of FIG. 21.

For the CTPD method, the lead compressor may start before the lag compressor when the call for cooling value CFC increases above a corresponding first activation point. The lag compressor has a second activation point, which is higher than the first activation point. As a result, startup of the lag compressor occurs after startup of the lead compressor. By default, the lead compressor may be a digital scroll compressor and the lag compressor may be a fixed scroll compressor.

The CTPD method may begin at 500. At 501, the expansion valve module 488 starts a motor overload protection (MOP) method to protect compressor motors via an overload module. This effectively reduces an opening percentage of the EEV when the lag compressor in the tandem set turns OFF. The expansion valve module 488 includes an overload module 491, an evaporator temperature module 492, an overwrite module 493, and an opening module 494.

An EEV may be used on each cooling circuit of a cooling system, as shown in FIG. 2. The evaporator temperature module 492 may control opening percentages for the EEVs by executing an expansion valve proportional integral derivative (EVPID) method. The EVPID method is used to control the opening percentages to increase an evaporator temperature to a superheat set point (i.e. a temperature greater than a predetermined temperature). The EVPID method may generate an EVPID value, which may be a valve opening percentage to attain a superheat condition, where the evaporator temperature is equal to the superheat set point. The opening module 494 may adjust the opening percentages of the EEVs based on the EVPID value.

The MOP method may include use of a parameter MOP-A, which refers to a temperature threshold. The temperature threshold is a temperature above which the MOP method is initiated by the overload module 491. The MOP method is initiated if a saturated suction temperature $T_{SUC}$ is greater than the temperature threshold as calculated by the overload module.

The purpose of the MOP method is to protect the compressor motor(s) from incoming cooling fluid vapor pressures and/or temperatures that are too high (i.e. greater than a predetermined pressure and a predetermined temperature). When the saturated suction temperature $T_{SUC}$ increases above the parameter MOP-A, the MOP method is started, the EVPID value is overridden or not used, and the opening percentage of the EEV is reduced. The rate of this reduction is dependent on how far the saturated suction temperature $T_{SUC}$ is above the parameter MOP-A. The more the saturated suction temperature $T_{SUC}$ is above the parameter MOP-A, the faster the EEV is closed.

For any given cooling fluid or refrigerant, the saturated suction temperature $T_{SUC}$ is purely a function of the suction pressure SUC. Reducing the suction pressure SUC, reduces the saturated suction temperature $T_{SUC}$. When the MOP method reduces the opening percentage of the EEV, the head pressure HEAD increases and the suction pressure SUC decreases. While a corresponding increase in a compression ratio (e.g., head pressure HEAD divided by suction pressure SUC) is provided for the MOP method, the increase in the compression ratio can also be provided to increase or maintain the pressure difference (e.g., head pressure minus suction pressure).

The CTPD-EV method alters the parameter MOP-A to start the MOP method to partially close the EEV. By utilizing the MOP method to establish a higher compression ratio before the lag compressor is turned OFF, it is less likely that pressure difference issues will arise. The CTPD-EV method is configured using parameters EVPD-A, EVPD-B, EVPD-C.

The parameter EVPD-A refers to a MOP temperature and defines a value above which the MOP-A temperature is set. The MOP-A temperature is set equal to the parameter EVPD-A when the CTPD-EV method is active. The parameter EVPD-B refers to a CTPD-EV duration, which defines an amount of time that the parameter MOP-A is to be overwritten or replaced with the parameter EVPD-A. The parameter EVPD-C refers to a MOP temperature restore rate which defines a rate at which the MOP-A temperature is restored to an original value (the MOP-A is no longer overridden) once the CTPD-EV method becomes inactive.

At 502, the lag compressor module 345 determines whether a lag compressor OFF criterion is satisfied. The lag compressor generates a criterion status signal CRIT to indicate when the OFF criterion is satisfied. An example criterion for turning OFF the lag compressor is provided by the method of FIG. 13, which includes turning OFF the lag compressor at 378, when at least one of the conditions at 372-376 is satisfied.

At 504, the lead compressor module 487, the expansion valve module 488, and the condenser fan module 346 initiate the CTPD-DS, CTPD-EV, and CTPD-FR methods based on the criterion status signal CRIT, as indicated by respective signals DS, EV, FR. Tasks 506, 510, 517, and 528 may be performed in parallel subsequent to task 504. The CTPD-DS method includes tasks 510-516. The CTPD-EV method includes tasks 517-526. The CTPD-FR method includes tasks 528-530.

At 506, the routine module 486 determines whether at least one of the CTPD-DS, CTPD-EV, and CTPD-FR methods is fully activated and generates a routine output signal ROUT. The CTPD-DS method may be fully activated, for example, when the digital scroll compressor PWM % is at 100%. The CTPD-EV method may be fully activated when, for example, the MOP-A value is stored and the overwrite timer 485 is started. The CTPD-FR method may be fully activated when, for example, the condenser fan speeds have been reduced as performed at 528. Task 508 is performed when at least one of the CTPD-DS, CTPD-EV, and CTPD-FR methods is fully activated based on the routine output signal ROUT.

At 508, the lag compressor module 345 maintains the lag compressor in an ON state for an additional predetermined delay period (e.g., 10 seconds) while the CTPD-DS, CTPD-EV, and CTPD-FR methods become fully activated. This predetermined delay period allows components affected by the CTPD-DS, CTPD-EV, and CTPD-FR methods to perform appropriate adjustments before the lag compressor is turned OFF. At 509, the lag compressor module 345 deactivates the lag compressor after the predetermined delay period.

At 510, the shutdown parameter module 489 determines the parameter DSPD-A, which is referred to as a digital scroll loading duration. This is the amount of time for which the digital scroll compressor operates at 100% or at the predetermined (or maximum) PWM % after the CTPD-DS method becomes active.

At 511, the lead compressor module 487 operates the lead compressor at a fully-loaded PWM % equal to 100% or a predetermined PWM %. This overrides a PWM % called for based on the PWMCFC value. The PWM % of the lead compressor may be held at a constant PWM % (100% or the predetermined PWM %) when the fixed compressor in the tandem set turns OFF. This ensures that when the fixed scroll compressor turns OFF, the reduction in a volumetric displacement rate of the tandem set is less than or equal to 50%. By minimizing the reduction in the volumetric displacement rate, the chances of a loss in the compressor pressure difference are reduced. As a result, the compressor pressure difference is not reduced.

At 512, the load duration timer 484 is started and generates a load duration signal TIML. At 514, the lead compressor module 487 determined whether the load duration signal TIML has exceeded a predetermined load duration. The predetermined load duration may be indicated by the parameter DSPD-A. Task 516 is performed when the load duration signal TIML exceeds the predetermined load duration. At 516, the lead compressor module 487 deactivates the CTPD-DS method and ramps the PWM % of the lead compressor back to the PWMCFC value or a value determined based on the PWMCFC value. The CTPD-DS method may end at 532.

In FIG. 21, a digital scroll plot for the CTPD-DS method is shown. FIG. 21 includes a digital scroll PWM % signal, a PWMCFC signal, and a lag compressor status signal. The digital scroll PWM % signal starts at the PWMCFC signal, increases to a peak (e.g., 100%) when the CTPD-DS method is activated, and then decreases back to the PWMCFC signal when the load duration time has lapsed. The PWMCFC signal transitions from a low state to a high state when the lag compressor motor is deactivated.

Also at 517, the shutdown parameter module 489 determines the parameters EVPD-A, EVPD-B, EVPD-C. At 518, the overload module 491 stores the parameter MOP-A in a second location of the memory 186. As a result the MOP-A value is stored in a first location and in a second location of the memory 186. At 520, the overwrite module 493 overwrites the parameter MOP-A that is stored in the first location. The overwrite module 493 stores the parameter EVPD-A as the MOP-A value in the first location. At 521, an EEV opening percentage is controlled based on EVPD-A.

At 522, the overwrite timer 485 is started and generates an overwrite timer signal TIMS. At 524, the expansion valve module 488 determines whether the overwrite timer signal TIMS has exceeded the parameter EVPD-B. If the parameter EVPD-B has been exceeded, task 526 is performed.

At 526, the overwrite module 493 changes the parameter MOP-A stored in the first location back from the parameter EVPD-A to the original parameter MOP-A stored at the second location. This is done at the rate defined by parameter EVPD-C. The original parameter MOP-A is copied from the second location of the memory 186 to the first location of the memory 186. The CTPD-EV method may end at 532 when the parameter MOP-A has been completely restored to its original value.

In FIG. 22, an expansion valve plot for the CTPD-EV method is shown. FIG. 22 includes an EVPID signal, an EEV opening % signal, and a MOP-A signal, which are associated respectively with the EVPID value, the opening percentage of the EEV, and the parameter MOP-A. FIG. 22 also includes the lag compressor motor status signal. As shown, the LAG compressor is switched OFF the predetermined period after the parameter MOP-A is set equal to the parameter EVPD-A. At this point, the EEV opening % signal ramps down and remains at a reduced EEV opening percentage until the overwrite timer is greater than the parameter EVPD-B. The parameter MOP-A is then ramped up to its original value and the EEV opening % signal is increased to the EVPID value.

The condenser fan module 346 may control the speeds of the condenser fan using a condenser fan proportional integral derivative (CFPID) method. The speeds of the condenser fan may be controlled to maintain a predetermined head pressure. The CFPID method may be used to generate a condenser output signal CF to control the condenser fan. The CFPID method may be used to generate the condenser output signal CF based on a parameter CF-A. The parameter CF-A refers to a condenser maximum fan speed, which defines a maximum speed that the condenser fan can operate. The parameter CF-A may be used as a high-limit for the actual speed of the condenser fan. As an example, when the condenser output signal CF is at 100%, the parameter CF-A may be set equal to a predetermined percentage (e.g., 90%). The condenser fan may operate at the predetermined percentage until the parameter CFPID is less than the condenser output signal CF-A.

The CTPD-FR method is used to temporarily reduce the parameter CF-A to provide a reduction in the speed of the condenser fan. This causes the head pressure HEAD in the corresponding cooling circuit to increase. By operating the tandem set at an elevated head pressure before the lag compressor turns OFF, loss in the pressure difference can be avoided.

The CTPD-FR method may include use of a parameter FRPD-A. The parameter FRPD-A refers to a condenser fan reduction exponent. When the fixed scroll compressor turns OFF, the parameter FRPD-A is a value that is used to determine a reduction magnitude in a speed of the condenser fan relative to a change in digital scroll PWM %.

Equation 1 provides a relationship between a maximum allowable condenser fan speed $F_1$ before the lag compressor is turned OFF and a maximum allowable condenser fan speed $F_2$ after the lag compressor is turned OFF.

$$F_2 = F_1 \left[ \left( \frac{C_2}{C_1} \right)^A \right] \quad (1)$$

In equation 1, the variable A is equal to the parameter FRPD-A. The parameter CF-A may be adjusted based on the variables $F_1$ (original CF-A) and $F_2$ (modified CF-A when CTPD-FR is started). The variable $C_1$ is equal to the parameter PWMCFC before lag compressor is turned OFF. The variable $C_2$ is equal to the parameter PWMCFC after the lag compressor is turned OFF. The variable $C_2$ is calculated by using the call for cooling value CFC at the time the CTPD-FR method is started. Based on Equation 1, increasing the FRPD-A parameter increases an amount of potential reduction in the speed of the condenser fan during the CTPD-FR method.

At 528, when the CTPD-FR method becomes active, the condenser fan module 346 may evaluate Equation 1. The parameter CF-A or original CF-A value is copied from a first location of the memory 186 to a second location of the memory 186. The parameter CF-A is then set equal to the maximum allowable condenser fan speed $F_2$ by storing $F_2$ at the first location of the memory 186. This causes the condenser fan module 346 to reduce the speed of the condenser fan to a value equal to the maximum allowable condenser fan speed $F_2$. The speed of the condenser fan may be controlled based on the original CF-A value or the maximum allowable condenser fan speed $F_1$ prior to the task 528 and/or prior to the lag compressor being shut OFF. The changeover to the maximum allowable condenser fan speed $F_2$ may include a step reduction in the speed of the condenser fan when the lag compressor turns OFF, as $F_2$ may be less than $F_1$.

At 530, condenser fan module 346 restores the parameter CF-A back to its original value. The condenser fan is operated based on the CFPID value to ramp the speed of the condenser fan towards the original CF-A value and back to a speed prior to the lag compressor being turned OFF. This is done at a rate based on proportional (P), integral (I), derivative (D) coefficients associated with the CFPID method. The CTPD method and/or CTPD-FR method may end at 532.

In FIG. 23, a condenser fan speed plot for the CTPD-FR method is shown. FIG. 23 includes a CF-A signal and a CFPID signal, which correspond respectively to the parameter CF-A and the CFPID value. FIG. 23 also includes the condenser fan speed signal CF and the lag compressor motor status signal. The condenser fan speed signal CF is reduced when the parameter CF-A is reduced at task 528. This may occur at a predetermined period (e.g., 10 seconds) before the lag compressor is turned OFF. The parameter CF-A is increased back to its original value after the lag compressor is turned OFF. The condenser fan speed signal CF is ramped up when the parameter CF-A is increased, which occurs at task 530.

To prevent and/or mitigate a reduction or a loss in compressor pressure difference when a compressor is deactivated, the method of FIG. 20 manipulates operation of system components in anticipation of one of the compressors in the tandem set being turned OFF. The method includes tasks to prevent occurrence of a low-pressure difference during lag compressor shutdown. This prevents damage to compressors and helps diminish undue reductions in cooling capacity when the lag compressor in the tandem set of compressors is turned OFF.

The parameters for the method of FIG. 20 may be configurable via the user interface 329 of FIG. 2. This allows the method to be configurable. The method interrupts operational control of a digital scroll compressor PWM %, an EEV opening position, and speeds of condenser fans when conditions to turn OFF one of the compressors in the tandem set are satisfied. This proactively reduces the chances of running the tandem set at low-pressure difference associated with an unloaded compressor condition.

The method of FIG. 20 may be applied to an air conditioning system with, for example, tandem digital scroll compressors, a micro-channel condenser, and an electronic expansion valve. As another example, the method of FIG. 20 may be applied to an air conditioning system with tandem digital scroll compressors and a condenser. The air conditioning system may not have an EEV. As yet another example, the method may be applied to an air conditioning system with tandem digital scroll compressors and an EEV. The air conditioning system may not have a condenser.

The above-described tasks of the methods of FIGS. 5A-5B, 7A-7B, 11, 13, 15, 16, and 20 are meant to be illustrative examples; the tasks may be performed iteratively, sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, methods, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, components and/or modules, these items should not be limited by these terms. These terms may be only used to distinguish one item from another item. Terms such as "first," "second," and other numerical terms when used herein do not imply a sequence or order unless clearly indicated by the context. Thus, a first item discussed herein could be termed a second item without departing from the teachings of the example implementations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
   while a lag compressor is in an ON state, determining whether an OFF criterion is satisfied to transition the lag compressor of a tandem set of scroll compressors from the ON state to an OFF state, wherein the tandem set of scroll compressors comprises a lead compressor;
   initiating at least one process in response to the OFF criterion being satisfied; and
   maintaining the lag compressor in the ON state for a predetermined period subsequent to the OFF criterion being satisfied,
   wherein the at least one process comprises at least one of
      overriding a called for opening percentage of the lead compressor including operating the lead compressor at a maximum level,
      overriding a motor overload protection method, wherein the motor overload protection method protects motors of the lead compressor and the lag compressor, and
      overriding a proportional integral derivative (PID) method to reduce a speed of a condenser fan, wherein the PID method controls the speed of the condenser fan.

2. The method of claim 1, wherein the maximum level is equal to 100%.

3. The method of claim 1, wherein:
   the at least one process comprises a scroll method; and
   the scroll method comprises
      determining a loading duration of the lead compressor,
      operating the lead compressor at the maximum level,
      starting a load duration timer and generating a timer signal, and
      deactivating the scroll method and ramping the lead compressor to a predetermined value when the timer signal is greater than the loading duration.

4. The method of claim 3, further comprising:
   determining a cooling value; and
   determining the predetermined value based on the cooling value, wherein the predetermined value is a pulse width modulation percentage for the lead compressor.

5. The method of claim 4, further comprising:
   determining a temperature error value; and
   determining a number of the compressors in the tandem set that are activated,
   wherein the cooling value is determined based on the temperature error value and the number of the compressors that are activated.

6. The method of claim 1, wherein the at least one process comprises:
   copying an overload temperature threshold used by the motor overload protection method from a first memory location to a second memory location;
   overwriting the overload temperature threshold stored in the first memory location with a predetermined value;
   controlling an opening percentage of an electronic expansion valve based on the predetermined value;
   starting an overwrite timer and generating a timer signal;
   comparing the timer signal to an expansion valve duration; and
   changing the predetermined value at the first memory location back to the overload temperature threshold when the timer signal is greater than the expansion valve duration.

7. The method of claim 6, wherein the changing of the predetermined value at the first memory location back to the overload temperature threshold comprises ramping the predetermined value to the overload temperature threshold at a predetermined rate.

8. The method of claim 6, further comprising:
   maintaining the opening percentage of the electronic expansion valve at a predetermined percentage based on a proportional integral derivative (PID) method prior to initiating the at least one process;

decreasing the opening percentage of the electronic expansion valve subsequent to initiating the at least one process; and increasing the opening percentage of the electronic expansion valve to the predetermined percentage when the timer signal is greater than the expansion valve duration.

9. The method of claim 1, further comprising:

controlling a speed of the condenser fan based on a first maximum speed prior to turning OFF the lag compressor; and controlling the speed of the condenser fan based on a second maximum speed after turning OFF the lag compressor, wherein the at least one process comprises determining the second maximum speed based on the first maximum speed, a first predetermined value, a second predetermined value, and a condenser fan reduction exponent.

10. The method of claim Si the at least one process further comprises ramping up the speed of the condenser fan (i) subsequent to controlling the speed of the condenser fan based on the second maximum speed, and (ii) based on the first maximum speed.

11. The method of claim 9, further comprising:

determining a cooling value;

determining the first predetermined value based on the cooling value, wherein the first predetermined value is a first pulse width modulation percentage for the lead compressor before the lag compressor is turned OFF; and determining the second predetermined value based on the cooling value, wherein the second predetermined value is a second pulse width modulation percentage for the lead compressor after the lag compressor is turned OFF.

12. The method of claim 11, further comprising:

determining a temperature error value; and determining a number of the compressors in the tandem set that are activated, wherein the cooling value is determined based on the temperature error value and the number of the compressors that are activated.

13. The method of claim 1, further comprising:

controlling a speed of the condenser fan based on (i) the PID method, and (ii) a first maximum speed prior to turning OFF the lag compressor, wherein the speed of the condenser fan is at an original speed prior to the lag compressor being turned OFF;

reducing the first maximum speed to a second maximum speed after turning OFF the lag compressor;

adjusting the speed of the condenser fan to the second maximum speed; and ramping up the speed of the condenser fan from the second maximum speed to the original speed.

14. The method of claim 1, wherein the at least one process comprises:

operating the lead compressor at the maximum level;

overriding the motor overload protection method; and overriding the PID method.

15. A system comprising:

a lag compressor module configured to, (i) while a lag compressor is in an ON state, determine whether an OFF criterion is satisfied to transition the lag compressor of a tandem set of scroll compressors from the ON state to an OFF state, and (ii) maintain the lag compressor in the ON state for a predetermined period subsequent to the OFF criterion being satisfied, and wherein the tandem set of scroll compressors comprises a lead compressor; and a lead compressor module configured to, in response to the OFF criterion being satisfied, at least one of,
 override a called for opening percentage of the lead compressor including operating the lead compressor at a maximum level,
 override a motor overload protection method, wherein the motor overload protection method protects motors of the lead compressor and the lag compressor, and
 override a proportional integral derivative (PID) method to reduce a speed of a condenser fan, wherein the PID method controls the speed of the condenser fan.

16. The system of claim 15, further comprising:

a load duration timer configured to determine a loading duration of the lead compressor; and an overwrite timer configured to generate a timing signal, wherein the lead compressor module is configured to, if the OFF criterion is satisfied, perform a scroll method including
 determining a loading duration of the lead compressor via the load duration timer,
 operating the lead compressor at the maximum level, and
 deactivating the scroll method and ramping the lead compressor to a predetermined value when the timing signal is greater than the loading duration.

17. The system of claim 15, further comprising an expansion valve module configured to, if the OFF criterion is satisfied:

copy an overload temperature threshold used by the motor overload protection method from a first memory location to a second memory location;

overwrite the overload temperature threshold stored in the first memory location with a predetermined value;

control an opening percentage of an electronic expansion valve based on the predetermined value;

start an overwrite timer and generating a timer signal;

compare the timer signal to an expansion valve duration; and change the predetermined value at the first memory location back to the overload temperature threshold when the timer signal is greater than the expansion valve duration.

18. The system of claim 15, further comprising:

a condenser fan module configured to control (i) a speed of the condenser fan based on a first maximum speed prior to turning OFF the lag compressor, and (ii) the speed of the condenser fan based on a second maximum speed after turning OFF the lag compressor; and a control module configure to, if the OFF criterion is satisfied, determine the second maximum speed based on the first maximum speed, a first predetermined value, a second predetermined value, and a condenser fan reduction exponent.

19. The system of claim 15, further comprising a condenser fan module configured to:

control a speed of the condenser fan based on (i) the PID method, and (ii) a first maximum speed prior to turning OFF the lag compressor, wherein the speed of the condenser fan is at an original speed prior to the lag compressor being turned OFF;

reduce the first maximum speed to a second maximum speed after turning OFF the lag compressor;
adjust the speed of the condenser fan to the second maximum speed; and
ramping up the speed of the condenser fan from the second maximum speed to the original speed.

20. The system of claim 15, wherein the lead compressor module is configured to:
operate the lead compressor at the maximum level;
override the motor overload protection method; and
override the PID method.

* * * * *